(12) United States Patent  (10) Patent No.: US 9,305,727 B2
Holsten  (45) Date of Patent: Apr. 5, 2016

(54) SYSTEMS, METHODS, AND APPARATUSES FOR CONTROLLING THE POWER SUPPLY OF A VACUUM CLEANER MOTOR

(71) Applicant: Emerson Electric Co., St. Louis, MO (US)

(72) Inventor: Stuart V. Holsten, Stover, MO (US)

(73) Assignee: EMERSON ELECTRIC CO., St. Louis, MO (US)

( * ) Notice: Subject to any disclaimer, the term of this patent is extended or adjusted under 35 U.S.C. 154(b) by 187 days.

(21) Appl. No.: 14/178,579

(22) Filed: Feb. 12, 2014

(65) Prior Publication Data

US 2015/0223658 A1    Aug. 13, 2015

(51) Int. Cl.
| A47L 9/28 | (2006.01) |
| H01H 35/18 | (2006.01) |
| A47L 5/36 | (2006.01) |
| A47L 7/00 | (2006.01) |
| A47L 9/19 | (2006.01) |

(52) U.S. Cl.
CPC ............. *H01H 35/18* (2013.01); *A47L 5/365* (2013.01); *A47L 7/0028* (2013.01); *A47L 9/19* (2013.01); *A47L 9/2821* (2013.01); *A47L 9/2842* (2013.01); *A47L 9/2889* (2013.01); *H01H 2231/012* (2013.01)

(58) Field of Classification Search
CPC ... A47L 9/2857; A47L 9/2821; A47L 9/2842; A47L 5/365; H01H 35/18; H01H 2231/012
See application file for complete search history.

(56) References Cited

U.S. PATENT DOCUMENTS

| 4,723,337 A * | 2/1988 | Ellison ................ A47L 11/4061 |
| | | 15/321 |
| 5,032,155 A | 7/1991 | Wiese et al. |
| 5,205,014 A * | 4/1993 | Yoo ....................... A47L 7/0028 |
| | | 15/353 |
| 5,394,587 A | 3/1995 | Parise |
| 5,920,955 A * | 7/1999 | Berfield ................ A47L 7/0028 |
| | | 15/321 |
| 5,966,775 A * | 10/1999 | Berfield ................... A47L 5/365 |
| | | 15/352 |
| 6,610,952 B2 * | 8/2003 | Crevling ............... A47L 7/0028 |
| | | 200/552 |
| 8,516,650 B2 * | 8/2013 | Beers .................... A47L 7/0019 |
| | | 15/319 |

* cited by examiner

*Primary Examiner* — Dung Van Nguyen
(74) *Attorney, Agent, or Firm* — Sutton McAughan Deaver PLLC

(57) ABSTRACT

Applicant has created systems, methods, and apparatuses for controlling the power supply of a vacuum cleaner motor. The systems and apparatuses include pressure taps to detect a pressure differential within a vacuum cleaner, a float that adjusts depending on an amount of liquid stored, and a power switch that toggles based on the pressure differential created by the position of the float. Alternatively, the float can be replaced by an air chamber so that the pressure differential is created by liquid rising above the volume of air trapped in the chamber. The method can include interrupting the current supplied to an electrical circuit of a power switch based upon a pressure differential created within the vacuum. By controlling the power supply to a vacuum cleaner motor based on a pressure differential created by the amount of liquid stored within the vacuum cleaner, the vacuum cleaner can automatically disable the vacuum cleaner's motor as the vacuum approaches its maximum liquid capacity.

17 Claims, 21 Drawing Sheets

SYSTEMS, METHODS, AND APPARATUSES FOR CONTROLLING THE POWER SUPPLY OF A VACUUM CLEANER MOTOR

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

1. Field of the Invention

The inventions disclosed and taught herein relate generally to controlling the power supplied to a vacuum cleaner's motor. More specifically, the inventions described relate to interrupting the power supplied to a vacuum cleaner's motor in response to the vacuum detecting that is approaching its maximum capacity for storing wastes, such as liquids or the like.

2. Description of the Related Art

The inventions disclosed and taught herein are directed to an improved system for controlling the power supplied to a vacuum cleaner's motor. Although these inventions can be used in numerous applications, the inventions will be disclosed in only a few of many applications for illustrative purposes.

Vacuum cleaners, such as wet/dry vacuums or work area vacuums, are commonly used to collect liquids and other aqueous-based debris and media from work surfaces and the like. When a wet/dry vacuum cleaner is switched to its "on" position, the vacuum motor is energized, which, in turn, rotates a blower wheel. The rotation of the blower wheel causes a vacuum within the vacuum collection drum. The vacuum created allows a volume of air to flow through an inlet plenum and into the drum of the vacuum.

Typical wet/dry vacuums will include a filter and a filter cage interfaced between the inlet plenum and the collection drum. As the vacuum collects liquids and other aqueous-based media, the collection drum fills from the bottom towards the top of the drum, which, in a typical configuration, contains the vacuum's powerhead and motor. As the drum fills, an operator must be cautious as to avoid overfilling the vacuum's drum beyond its capacity. That is, without a mechanism to prevent overfilling, an operator could carelessly continue operating the vacuum after the liquid reaches the collection drum's maximum capacity, resulting in significant damage to the vacuum and its motor.

In order to mitigate these risks, previous solutions to this problem include disposing a float within the collection drum's filter cage. The float can adjust its position depending on the amount of liquid and other debris stored in the drum of the vacuum. Typically, wet/dry vacuums are coupled to a hose for facilitating the collection of the liquid media drawn from the work surface into the drum. As the drum fills with this liquid media, the float rises and eventually contacts the inlet plenum. By contacting the plenum, the float disrupts the vacuum created in the drum, thus preventing any more liquid from being collected in the drum until the liquid is subsequently disposed.

For example, U.S. Pat. No. 5,032,155 to Wiese et al. discloses a wet/dry vacuum with automatic shutoff that interrupts the flow of air to a vacuum blower when water collected in the collection tank reaches a predetermined level. The system employs a float that is shaped to define a downwardly extending recess adapted to surround the filter element so that when the liquid level in the tank reaches a predetermined level, the float is buoyed upwardly until its annular rim engages the seal gasket to interrupt the flow of air to the blower inlet.

U.S. Pat. No. 5,394,587 to Parise discloses a hot water vacuum extraction machine with float sealed riser tube shut-off device that includes a float ball capable of closing off the top of the riser tube to prevent water returning with the airstream to the vacuum pump and its drive motor when overfilling the recovery tank with water. The hot water vacuum extraction machine employs a hydro-air filter with a float sealed riser tube for automatically sealing off the inlet port to the riser tube as a result of a predetermined volume of water accumulating within the recovery tank. It further prevents water from splashing into the open inlet port of the riser tube upon overfilling of the recovery tank with water.

Although these prior art solutions can be effective for preventing the collection drum from being accidentally overfilled, there are several drawbacks to them as well. For example, even after the vacuum in the collection drum is disrupted, the motor will continue operate until an operator acts upon it (e.g., manually toggles the power supply switch from its "on" position to its "off" position). Furthermore, by requiring an operator's manual intervention to disable the motor, an operator is required to consistently monitor the status of the vacuum to ensure that she is able to manually shut down the vacuum after it reaches its filling capacity.

What is required, therefore, is a solution that provides a vacuum cleaner with a mechanism for controlling the power supply to the vacuum upon detecting that the collection drum is approaching or has reached its filing capacity without the need for manual intervention.

Accordingly, the inventions disclosed and taught herein are directed to systems, methods, and apparatuses for controlling the power supply of a vacuum cleaner motor that overcome the problems as set forth above.

BRIEF SUMMARY OF THE INVENTION

The inventions disclosed and taught herein are directed to systems, methods, and apparatuses for controlling the power supply of a vacuum cleaner motor. The objects described above and other advantages and features of the invention are incorporated in the application as set forth herein, and the associated appendices and drawings.

Applicant has created systems, methods, and apparatuses for controlling the power supply of a vacuum cleaner motor. The systems and apparatuses include pressure taps to detect a pressure differential within a vacuum cleaner, a float that adjusts depending on an amount of liquid stored, and a power switch that toggles based on the pressure differential created by the position of the float. Alternatively, the float can be replaced by an air chamber so that the pressure differential is created by liquid rising above the volume of air trapped in the chamber. The method can include interrupting the current supplied to an electrical circuit of a power switch based upon a pressure differential created within the vacuum. By controlling the power supply to a vacuum cleaner motor based on a pressure differential created by the amount of liquid stored within the vacuum cleaner, the vacuum cleaner can automatically disable the vacuum cleaner's motor as the vacuum approaches its maximum liquid capacity.

In accordance with a first embodiment of the present invention, the disclosure provides an apparatus for interrupting a power supply to a vacuum cleaner motor that can include an inlet plenum and at least two pressure taps adapted to detect a pressure differential between a first and second portion of the inlet plenum. The first and second portion of the inlet plenum can include an area inside the inlet plenum and an area outside the inlet plenum, respectively. The apparatus can further include a float adapted to change its position as a function of an amount of liquid stored in a vacuum cleaner and a power switch adapted to toggle from an "on" position to an "off" position based on the pressure differential between the first and second portion of the inlet plenum.

The apparatus can further include a switch actuator and a biasing device, wherein the switch actuator can be coupled to the power switch and can be further adapted to toggle the power switch from the "on" position to an "off" position depending upon a state of the biasing device, such as when the biasing device is in an unbiased state. Finally, the apparatus can further include a membrane, wherein the membrane can be adapted to flex in response to the pressure differential between the first and second portion of the inlet plenum. The pressure differential can be a result of the float contacting at least a portion of the inlet plenum. Further, the float can rise and fall as the amount of liquid stored in the vacuum cleaner increases and decreases, respectively, and the float can rise to contact the at least a portion of the inlet plenum as the amount of liquid stored in the vacuum clean approaches its maximum capacity.

In accordance with a further embodiment of the present disclosure, an apparatus for interrupting a power supply to a vacuum cleaner motor that can include an inlet plenum and at least two pressure taps adapted to detect a pressure differential between a first and second portion of the inlet plenum is provided. The first and second portion of the inlet plenum can include an area inside the inlet plenum and an area outside the inlet plenum, respectively. The apparatus can further include a float adapted to change its position as a function of an amount of liquid stored in a vacuum cleaner and a power switch comprising an electrical circuit, wherein the current supply to the electrical circuit can be adapted to be interrupted based on the pressure differential between the first and second portion of the inlet plenum.

The apparatus can further include a switch shoulder and an actuator, wherein the current supply can be adapted to be interrupted depending upon the position of the actuator and the current supply can be interrupted when the switch shoulder contacts the actuator. Finally, the apparatus can further include a membrane, wherein the membrane can be adapted to flex in response to the pressure differential between the first and second portion of the inlet plenum. The pressure differential can be a result of the float contacting at least a portion of the inlet plenum. Further, the float can rise and fall as the amount of liquid stored in the vacuum cleaner increases and decreases, respectively, and the float can rise to contact the at least a portion of the inlet plenum as the amount of liquid stored in the vacuum cleaner approaches its maximum capacity.

In accordance with yet another embodiment of the present invention, the disclosure provides details of an apparatus for interrupting a power supply to a vacuum cleaner motor that can include an air chamber, wherein the pressure of air in the air chamber can be adapted to vary as a function of an amount of liquid stored in a vacuum cleaner. The apparatus can further include at least two pressure taps adapted to detect a pressure differential between a first and second portion of the vacuum cleaner and a power switch that can include an electrical circuit, wherein a current supply to the electrical circuit can be adapted to be interrupted based on the pressure differential between the first and second portion of the vacuum cleaner. The first and second portion of the vacuum cleaner can include an area inside the air chamber and an area outside the air chamber, respectively, and the pressure differential can increase as the amount of liquid stored in the vacuum cleaner rises above the air chamber. Finally, the apparatus can further include a membrane, wherein the membrane can be adapted to flex in response to the pressure differential between the first and second portion of the inlet plenum.

The disclosure also provides a first embodiment of a system for interrupting a power supply to a vacuum cleaner that can include a vacuum cleaner motor and a drum that can be adapted to store liquids collected by the vacuum cleaner and further that can include an inlet plenum. The system can further include at least two pressure taps that can be adapted to detect a pressure differential between a first and second portion of the inlet plenum, a float that can be adapted to change its position as a function of the amount of liquid stored in the drum, and a power switch adapted to disable the vacuum cleaner motor. The power switch can be adapted to toggle from an "on" position to an "off" position upon the detection of the pressure differential between the first and second portion of the inlet plenum.

The disclosure also provides a second, further embodiment of a system for interrupting a power supply to a vacuum cleaner that can include a vacuum cleaner motor and a drum that can be adapted to store liquids collected by the vacuum cleaner and further comprising an inlet plenum. The system can further include at least two pressure taps that can be adapted to detect a pressure differential between a first and second portion of the inlet plenum, a float that can be adapted to change its position as a function of the amount of liquid stored in the drum, and a power switch comprising an electrical circuit adapted to disable the vacuum cleaner motor. The current supply to the electrical circuit can be adapted to disable the vacuum cleaner motor.

The disclosure also provides yet another embodiment of a system for interrupting a power supply to a vacuum cleaner that can include a vacuum cleaner motor and a drum that can be adapted to store liquids collected by the vacuum cleaner. The system can further include an air chamber, wherein the pressure of air in the air chamber is adapted to vary as a function of an amount of liquid stored in the vacuum cleaner and at least two pressure taps that can be adapted to detect a pressure differential between a first and second portion of the vacuum cleaner. Furthermore, the system can include a power switch comprising an electrical circuit that can be adapted to disable the vacuum cleaner motor. The current supply to the electrical circuit can be adapted to be interrupted based on the pressure differential between the first and second portion of the vacuum cleaner.

The disclosure also provides a method for interrupting a power supply to a vacuum cleaner motor that can include the steps of providing an inlet plenum and providing a float that can be further adapted to change its position as a function of an amount of liquid stored in a vacuum cleaner. The method can further include the steps of detecting a pressure differential between a first and second portion of the inlet plenum based, at least in part, upon the position the float and interrupting a current supply of an electrical circuit of a power switch coupled to the vacuum cleaner motor based on the detected pressure differential between the first and second portion of the inlet plenum.

The disclosure further provides a method for activating a power supply to a vacuum cleaner motor that can include the steps of providing a reset shaft, wherein at least a portion of the reset shaft is disposed as an external surface of a vacuum cleaner and providing a actuator, wherein the actuator is coupled to a stop shoulder and a power switch that can include an electrical circuit. Furthermore, the method can include the step of decoupling the stop shoulder from the actuator by repositioning the reset shaft, wherein the decoupling step can be adapted to complete an electrical circuit coupled to the vacuum cleaner motor.

BRIEF DESCRIPTION OF THE SEVERAL VIEWS OF THE DRAWINGS

The following figures form part of the present specification and are included to further demonstrate certain aspects of the present invention. The invention may be better understood by reference to one or more of these figures in combination with the detailed description of specific embodiments presented herein.

Figure 1A:
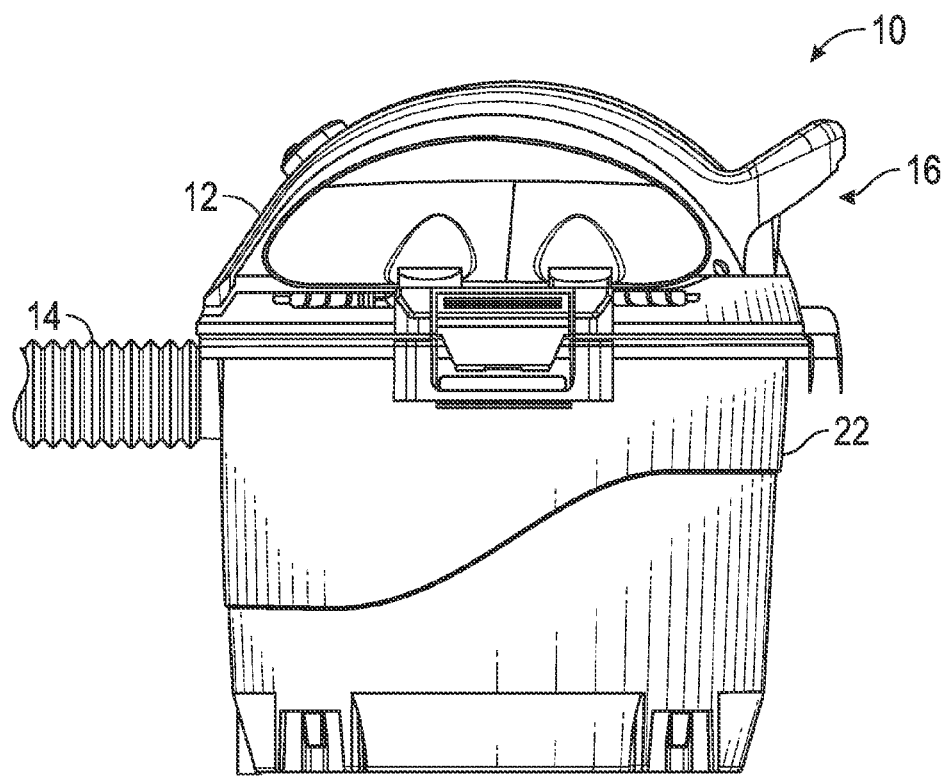
FIG. 1A illustrates a schematic side view of a first embodiment of an exemplary vacuum cleaner of the present disclosure with the filter removed for clarity.

While the inventions disclosed herein are susceptible to various modifications and alternative forms, only a few specific embodiments have been shown by way of example in the drawings and are described in detail below. The Figures and detailed descriptions of these specific embodiments are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION OF THE INVENTION

The Figures described above and the written description of specific structures and functions below are not presented to limit the scope of what Applicant has invented or the scope of the appended claims. Rather, the Figures and written description are provided to teach any person skilled in the art to make and use the invention for which patent protection is sought.

Those skilled in the art will appreciate that not all features of a commercial embodiment of the invention are described or shown for the sake of clarity and understanding. Persons of skill in this art will also appreciate that the development of an actual commercial embodiment incorporating aspects of the present invention will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location and from time to time. While a developer's efforts might be complex and time-consuming in an absolute sense, such efforts would be, nevertheless, a routine undertaking for those of skill in this art having benefit of this disclosure.

It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one functional member with another in a unity fashion. The coupling can occur in any direction, including rotationally.

The term "approximately"—when used in conjunction with the measurement of pressure P1 and pressure P2 (e.g., "P1 is approximately equal to P2")—is used broadly throughout the disclosure to include measured pressure values that are equal (e.g., pressure P1 equals pressure P2) and measured pressure values that are within 10% of each other's measured values. For example, if P1 is measured at 101.325 kPA, then P2 is "approximately equal to" P1 if it is within the range of 91.193-111.458 kPA.

Applicant has created systems, methods, and apparatuses for controlling the power supply of a vacuum cleaner motor. The systems and apparatuses include pressure taps to detect a pressure differential within a vacuum cleaner, a float that adjusts depending on an amount of liquid stored, and a power switch that toggles based on the pressure differential created by the position of the float. Alternatively, the float can be replaced by an air chamber so that the pressure differential is created by liquid rising above the volume of air trapped in the chamber. The method can include interrupting the current supplied to an electrical circuit of a power switch based upon a pressure differential created within the vacuum. By controlling the power supply to a vacuum cleaner motor based on a pressure differential created by the amount of liquid stored within the vacuum cleaner, the vacuum cleaner can automatically disable the vacuum cleaner's motor as the vacuum approaches its maximum liquid capacity.

Figure 1B:
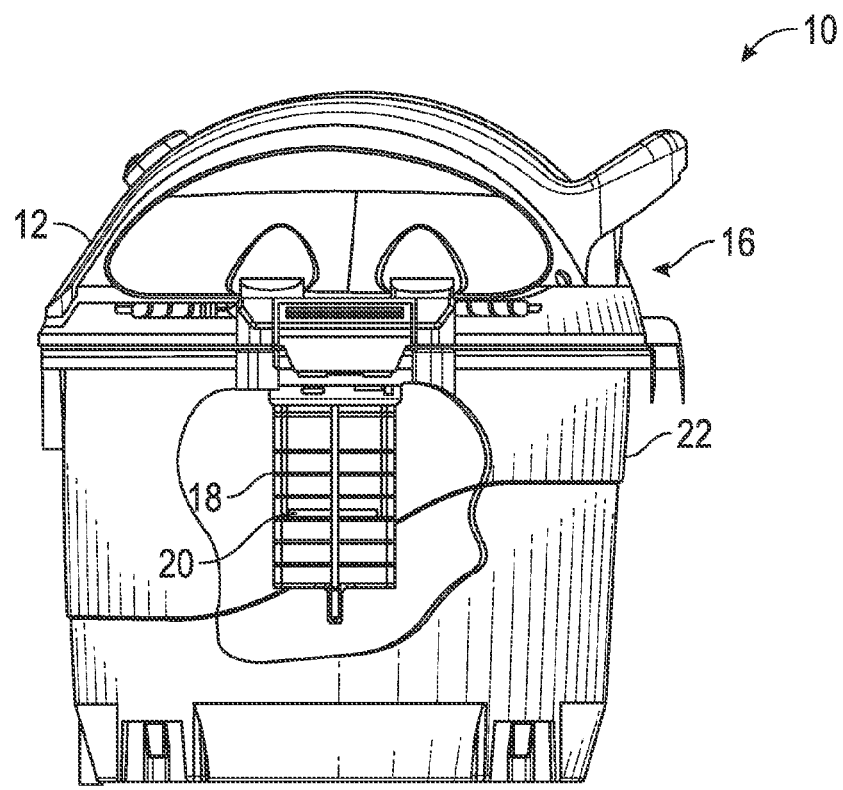
FIG. 1B illustrates a schematic side view of the vacuum cleaner of FIG. 1A, with a partial cut-away showing a first embodiment of an exemplary, typical filter cage inside the collection drum of a vacuum cleaner with the filter removed for clarity.

Turning now to the Figures, FIG. 1A illustrates a schematic side view of a first embodiment of an exemplary vacuum cleaner of the present disclosure with the filter removed for clarity. FIG. 1B illustrates a schematic side view of the vacuum cleaner of FIG. 1A, with a partial cut-away showing a first embodiment of an exemplary, typical filter cage inside the collection drum of a vacuum cleaner with the filter removed for clarity. These Figures will be described in conjunction within one another.

Vacuum 10 can include a collection canister, such as a drum 22 (equivalently referred to herein as a collection drum, vacuum body, or body). The drum 22 can include a bottom, sides, and an open top. Further, vacuum 10 can include a motor cover 12 for covering the vacuum's motor (not shown), a hose 14, and a powerhead 16. In one example, the powerhead 16 can be removed from the drum 22 such as by being disposed in a configuration where the powerhead 16 is releasably secured via one or more latches (not shown) over the top of the drum 22. Vacuum 10 can be battery powered, powered through AC or DC electricity, such as through a power cord (not shown). The drum 22 can be circular, cylindrical, or oval in shape, or in the alternative, may be of another suitable shape as appropriate, such as square or rectangular, without limitation.

Although not depicted in the Figures, vacuum 10 may, but need not, include a plurality of caster assemblies (not shown) connected to casters (not shown) and removably or permanently coupled about the bottom region of collection drum 22 via formed drum mounts (not shown). The caster assemblies may be removable or permanently fixed as appropriate for the particular vacuum appliance and its intended applications. Furthermore, vacuum 10 can include one or more drum handles (not shown).

Collection drum 22 may also optionally include a drain plug (not shown) at the bottom of the drum 22 to aid in the removal of liquid debris from within the drum 22. For example, the drain plug may aid with the ease of draining liquid debris from the drum 22, aid with the ease in cleaning the drum 22 once the powerhead 16 has been removed, or facilitate the attachment of a vacuum pump accessory (not shown). Powerhead 16 typically can have a handle (not shown) formed onto or into it, as appropriate, and it can house a motor and impeller assembly (not shown) for establishing vacuum pressure within the vacuum cleaner 10 when power is being supplied to vacuum 10. The handle can include a lever, latch, pivot, or other protuberance or protrusion capable of being grasped by a user's hand.

The hose 14 can include a hose, tube, or other conduit, either flexible or rigid, and it may be configured so that one end can be inserted into vacuum inlet (not shown) formed in, for example, powerhead 16 or the upper region of collection drum 22, and in fluid connection with powerhead 16 within the vacuum 10 itself. In one non-limiting embodiment of the present disclosure, hose 14 is simply friction-fit into vacuum inlet (not shown). Similarly and equally acceptable, hose 14 can be lock-fitted into vacuum inlet, as appropriate.

While some components may be formed integrally, others may be formed separately and otherwise coupled together, which may include the use of fasteners, such as screws, clips, brackets, adhesives, or other couplers. Further, where components may be sealingly coupled to one another, seals may be coupled there between. Seals may include gaskets, O-rings, sealants, adhesives, or other seals, whether or not specifically described herein, as will be readily understood by one of ordinary skill having the benefits of the present disclosure.

For purposes of clarity and understanding, one or more of these components may not be specifically described or shown while, nevertheless, being present in one or more embodiments of the invention, such as in a commercial embodiment, as will be readily understood by one of ordinary skill in the art.

Figure 2A:
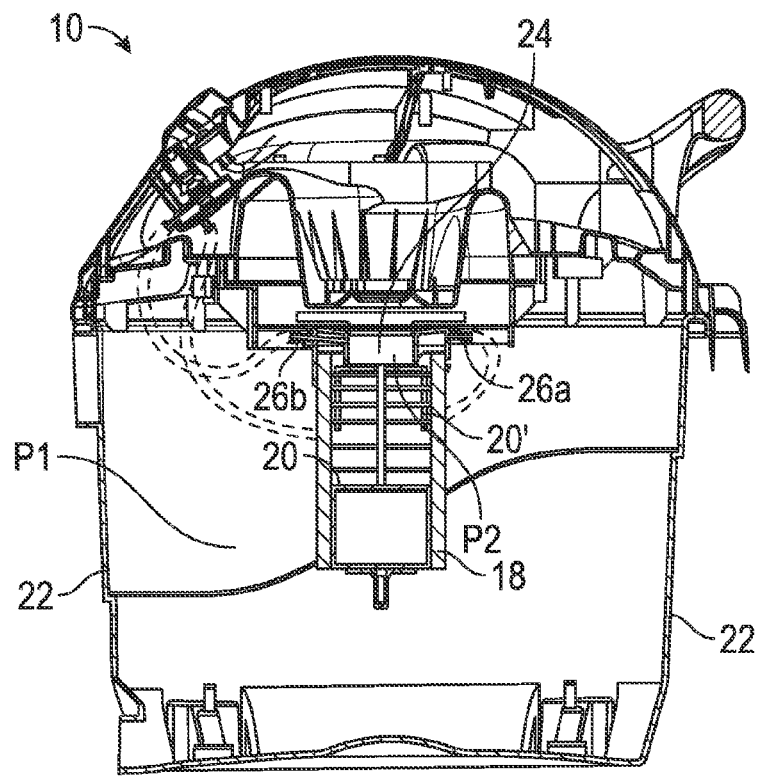
FIG. 2A illustrates a section view of the vacuum cleaner of FIG. 1A with the filter removed for clarity.
Figure 2B:
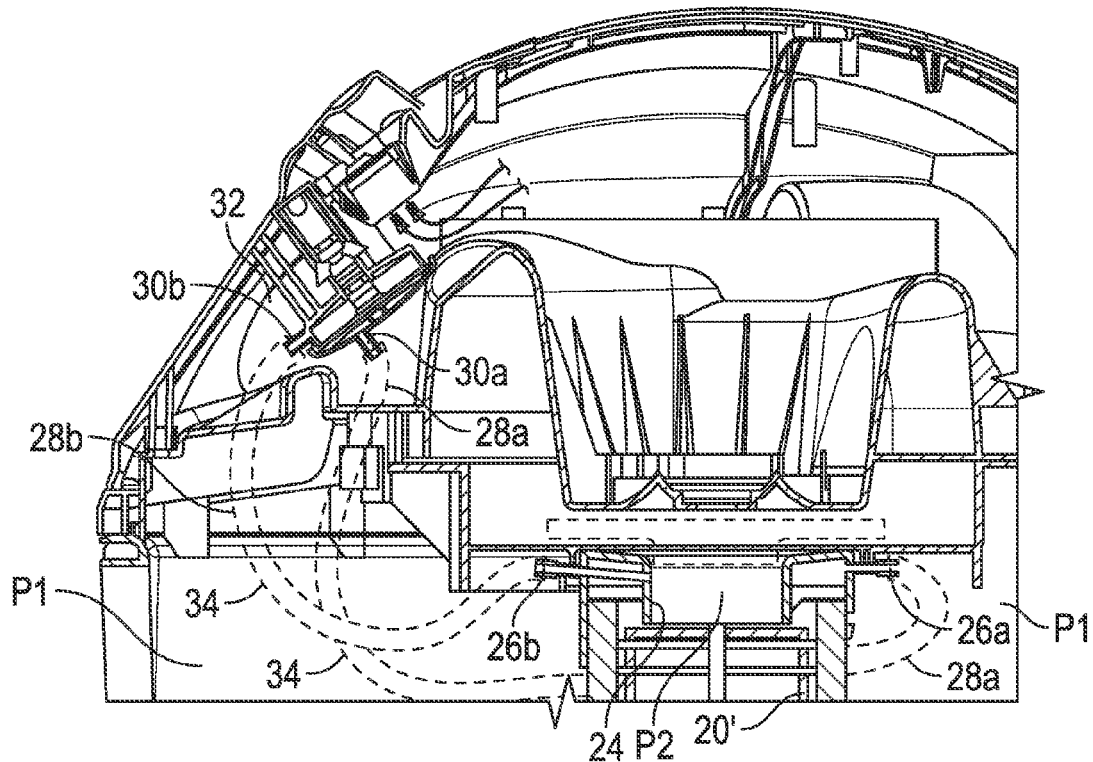
FIG. 2B illustrates an enlarged view of the vacuum cleaner illustrated in FIG. 2A.

FIG. 2A illustrates a section view of the vacuum cleaner of FIG. 1A with the filter removed for clarity. FIG. 2B illustrates an enlarged view of the vacuum cleaner illustrated in FIG. 2A. These Figures will be described in conjunction with one another.

Vacuum 10 can further include plenum pressure taps 26a and 26b, first conduits 28a and 28b and housing pressure taps 30a and 30b. The plenum pressure taps 26a and 26b, first conduits 28a and 28b, and housing pressure taps 30a and 30b can be used in conjunction with one another, along with the movement of the float 20 as it rises to contact the inlet plenum 24, to create and measure a pressure differential within the vacuum 10. More specifically, liquid entering the drum 22 (such as through the hose 14 illustrated in FIG. 1A) falls to the bottom of the drum 22 as it collects debris. As the drum collects liquids, the float 20, being configured to be more buoyant than the liquid collected in the drum 22, will rise with the liquid being collected. As the float 20 contacts the inlet plenum 24, the vacuum inside the drum 22 is interrupted, thus creating a pressure differential between the drum 22 and inlet plenum 24. This pressure differential is measured, in part, with the aid of the above-referenced taps.

Inlet plenum 24 may include one or more openings in fluid communication with one another. Inlet plenum 24 may be of single piece construction, but need not be, and may alternatively include a plurality of components coupled to one another. Inlet plenum 24 can be fluidly coupled to a portion of the intake to the vacuum motor (not shown) and cage 18, for allowing air to flow there between, as will be further described below. In one example, inlet plenum 24 can be fluidly coupled to cage 18, including being formed integrally therewith, in whole or in part. Cage 18 can be tubular, and may be configured to support a filter (not shown), such as receiving a filter there around. Cage 18 can include one or more openings therein, or in the alternative, it may have an "open" or "slotted" configuration, that may include support members such as ribs disposed in horizontal and/or vertical directions with respect to the cage 18.

Plenum pressure tap 26a can be located outside the inlet plenum 24. The pressure tap 26a can sense the vacuum pressure inside the drum 22. This pressure is depicted in the Figures as pressure P1. Similarly, pressure tap 26b can be located inside the inlet plenum 24. The pressure tap 26b senses the vacuum pressure inside inlet plenum 24. This pressure is depicted in the Figures as pressure P2. When the vacuum 10 is operating under "normal" operating conditions (i.e., the drum 22 has collected little or no water P1 is approximately equal to P2. Put simply, without the float 20 partially covering or fully covering inlet plenum 24, air may flow freely through inlet plenum 24 and into the drum 22, thus equalizing the pressure differential. The pressure P1 and pressure P2, therefore, typically equals one another under "normal" operating conditions.

As the drum 22 collects liquids and the float 20 rises, eventually pressure P2 will fall below that of P1 because the float 20 will partially cover or fully cover the inlet plenum 24 as it rises in the drum 22 to meet it. That is, the airflow between the inlet plenum 24 and the drum 22 is impeded. Once this occurs, pressure P2 (which remains in a vacuum condition) will be less than pressure P1 (which now increases to, at, or near atmospheric pressure after the float 20 fully contacts and covers the inlet plenum 24), thereby causing a pressure differential between pressures P1 and P2.

The pressure P1 and pressure P2 are measured through taps connected to or coupled to the housing 32 (as described in greater detail in conjunction with FIG. 3A) that are coupled with first conduits 28a and 28b. These first conduits, when described together, are further referenced by this disclosure and illustrated in the Figures as conduit 34. Conduit 34, for example, can include a hose, tubing, or any other type of conduit to allow the flow of air from one point to another. Furthermore, any tubing or conduit that can withstand collapse under typical pressures exerted within vacuum 10 can be used to aid the housing's 32 measurement and/or detection of a pressure differential between pressure P1 and pressure P2.

In an exemplary and non-limiting illustrative embodiment, the conduit 34 can be replaced with air passageways through various portions of the vacuum 10 (such as its lid (not shown) powerhead 16, etc.). For example, these passageways can be coupled to these other portions of vacuum 10 or, in the alternative, be formed as part of those features (such as, for example, through molding of the passageway into the lid).

Referring again to the first conduits 28a, and 28b, first conduit 28a can be used to couple plenum pressure tap 26a to housing pressure tap 30a, and first conduit 28b can be used to couple plenum pressure tap 26b to housing pressure tap 30b. These conduits and their respective functions and couplings are described in greater detail below in conjunction with several of the Figures (e.g., FIGS. 3A-3D).

Figure 3A:
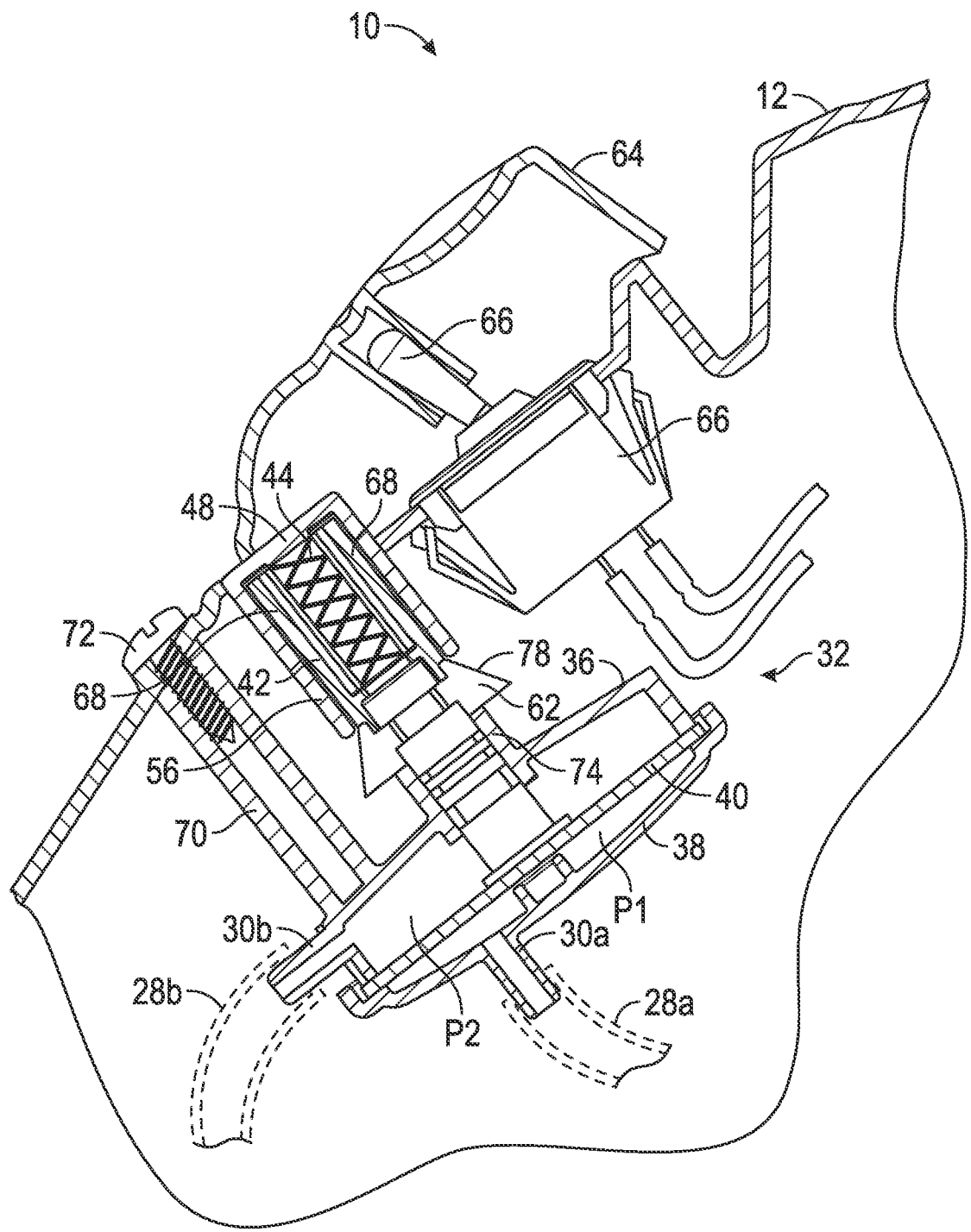
FIG. 3A illustrates an enlarged view of the vacuum cleaner illustrated in FIG. 2B with several elements omitted for clarity in an exemplary configuration where pressure P1 is approximately equal to P2.
Figure 3B:
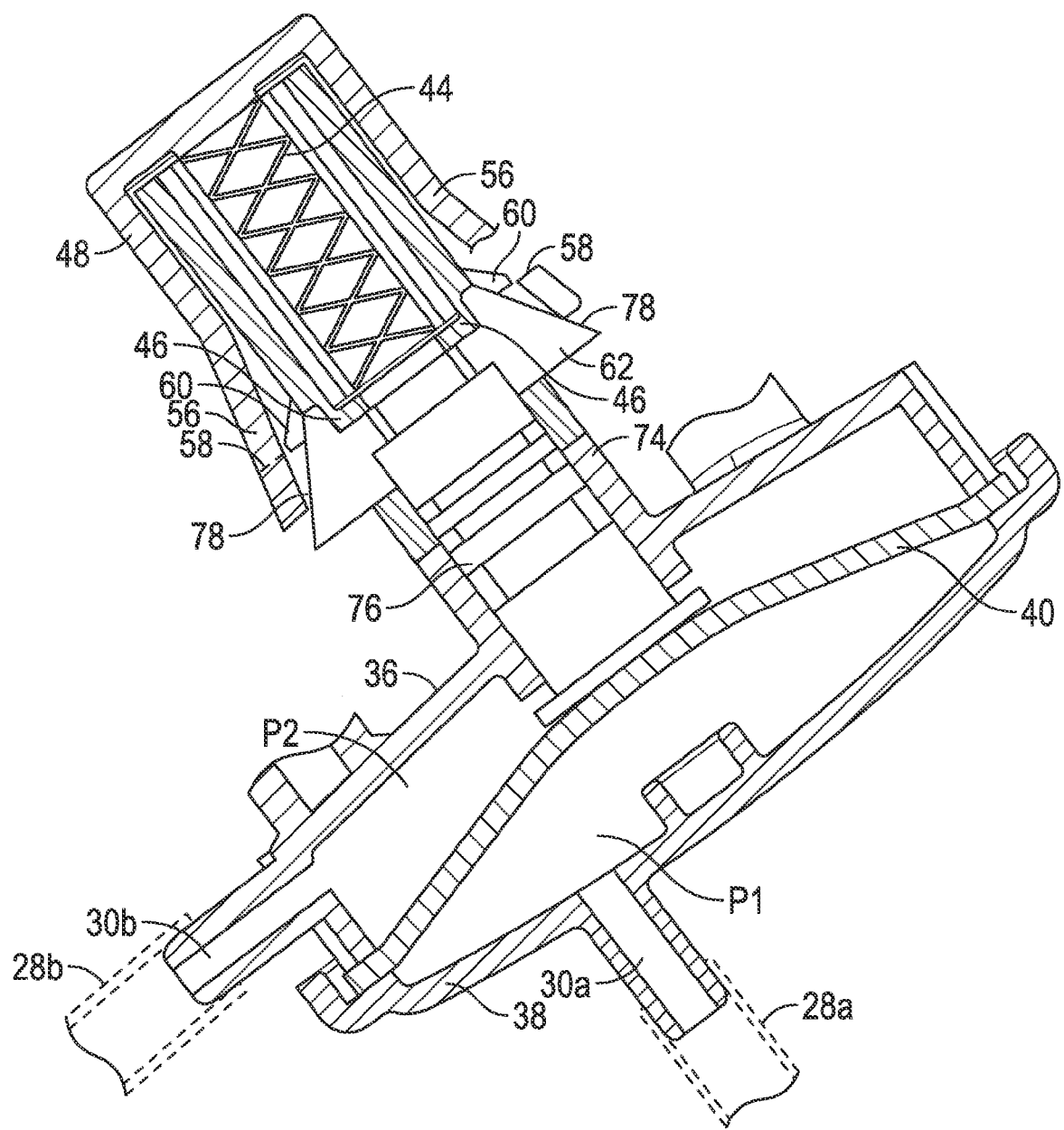
FIG. 3B illustrates an enlarged cross-sectional view of the vacuum cleaner illustrated in FIG. 3A with several elements omitted for clarity in an exemplary configuration where pressure P1 is greater than pressure P2.
Figure 3C:
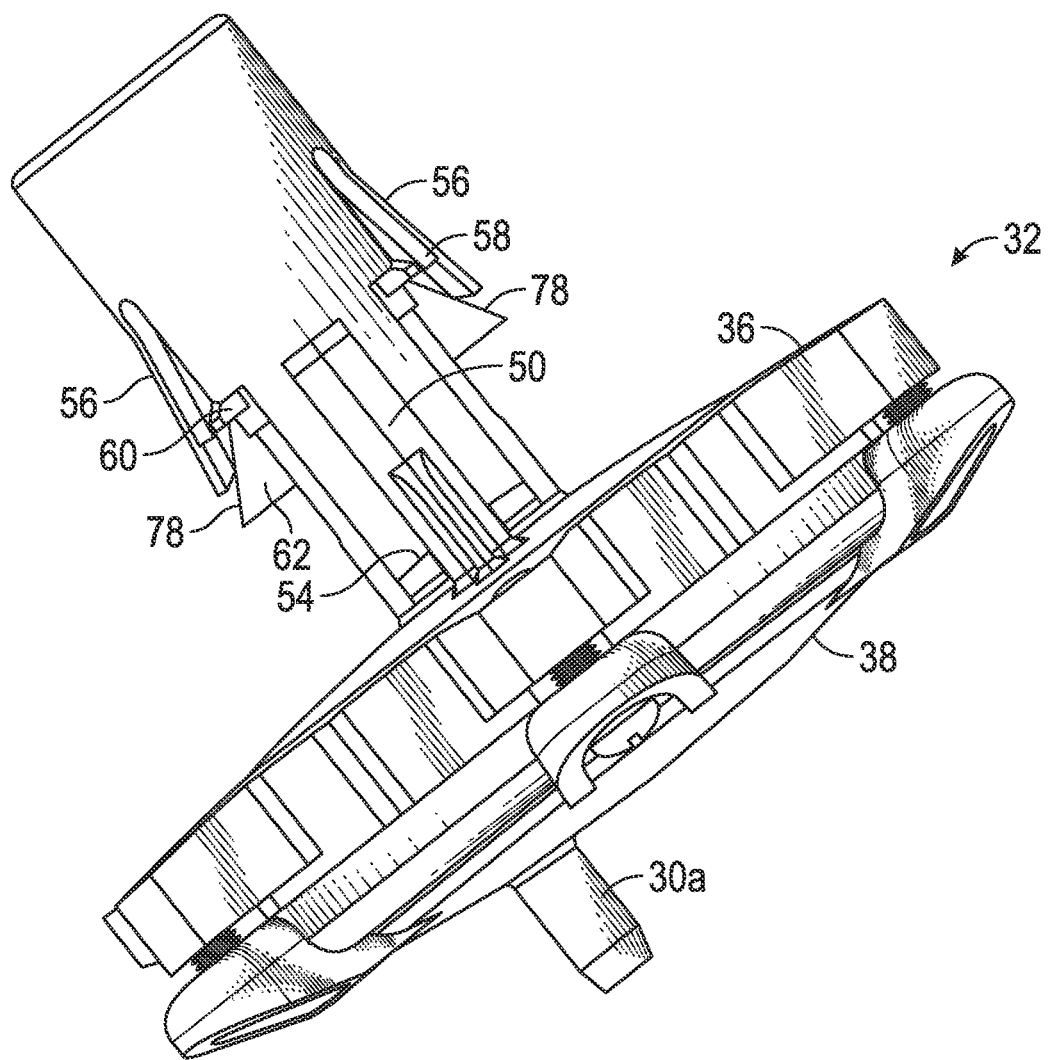
FIG. 3C illustrates a non-sectioned view of the vacuum cleaner illustrated in FIG. 3B with several elements omitted for clarity.
Figure 3D:
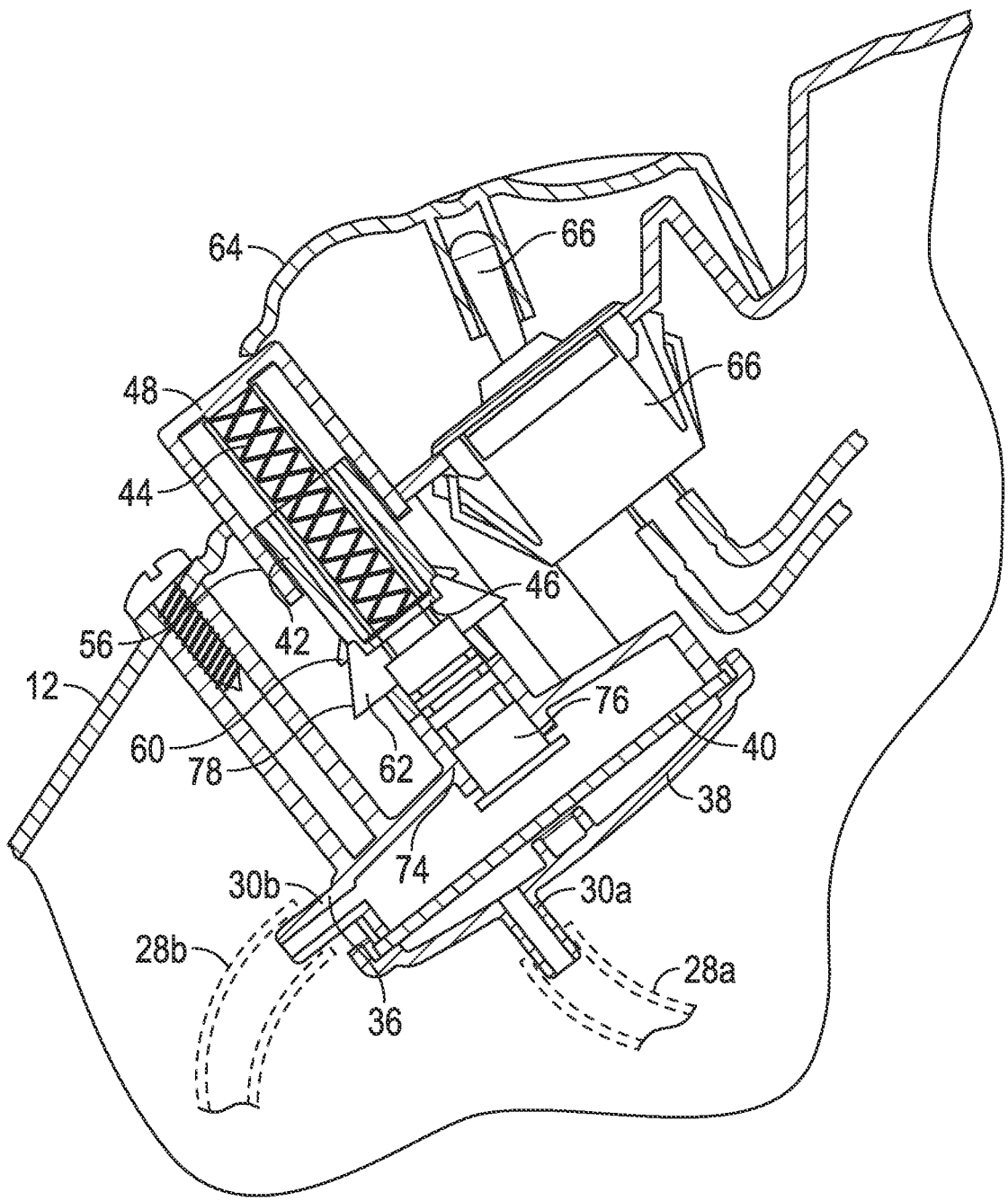
FIG. 3D illustrates a detail view of FIG. 3A with the spring cap released and the actuator and switch in the "off" position.

FIG. 3A illustrates an enlarged view of the vacuum cleaner illustrated in FIG. 2B with several elements omitted for clarity in an exemplary configuration where pressure P1 is approximately equal to P2. FIG. 3B illustrates an enlarged cross-sectional view of the vacuum cleaner illustrated in FIG. 3A with several elements omitted for clarity in an exemplary configuration where pressure P1 is greater than pressure P2. FIG. 3C illustrates a non-sectioned view of the vacuum cleaner illustrated in FIG. 3B with several elements omitted for clarity. FIG. 3D illustrates a detail view of FIG. 3A with the spring cap released and the actuator and switch in the "off" position. These Figures will be described in conjunction with one another.

Housing 32 can include an upper housing 36 and lower housing 38. The upper housing 36 and lower housing 38 can include housing pressure taps 30b and 30a, respectively. Conduit 34 can be coupled to the pressure taps such that first conduit 28a is coupled to housing pressure tap 30a and first conduit 28b is coupled to housing pressure tap 30b. In other words, first conduit 28a can be coupled to both plenum pressure tap 26a (as shown in FIG. 2B) and housing pressure tap 30a in order to detect and measure pressure P1. Similarly, first conduit 28b can be coupled to both plenum pressure tap 26b (As shown in FIG. 2B) and housing pressure tap 30b in order to detect and measure pressure P2. In this particular configuration, thus, pressure P1 can be measured from lower housing 38 and pressure P2 can be measured from upper housing 36.

Figure 4A:
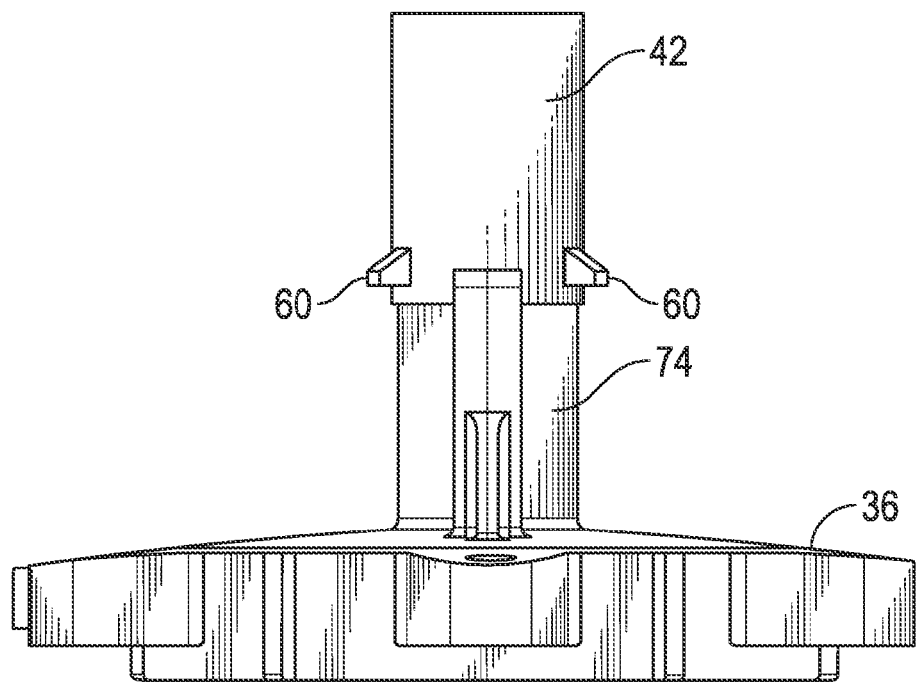
FIG. 4A illustrates a front view of the upper housing illustrated in FIG. 3A with several elements omitted for clarity.
Figure 4B:
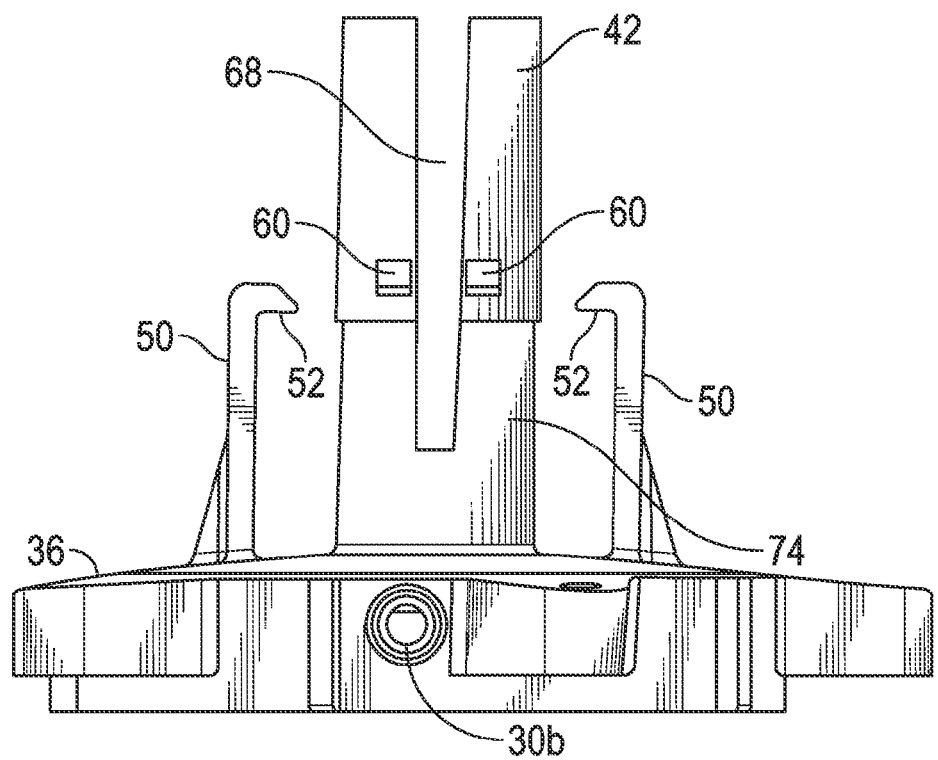
FIG. 4B illustrates a side view of the upper housing illustrated in FIG. 4A with several elements omitted for clarity.
Figure 4C:
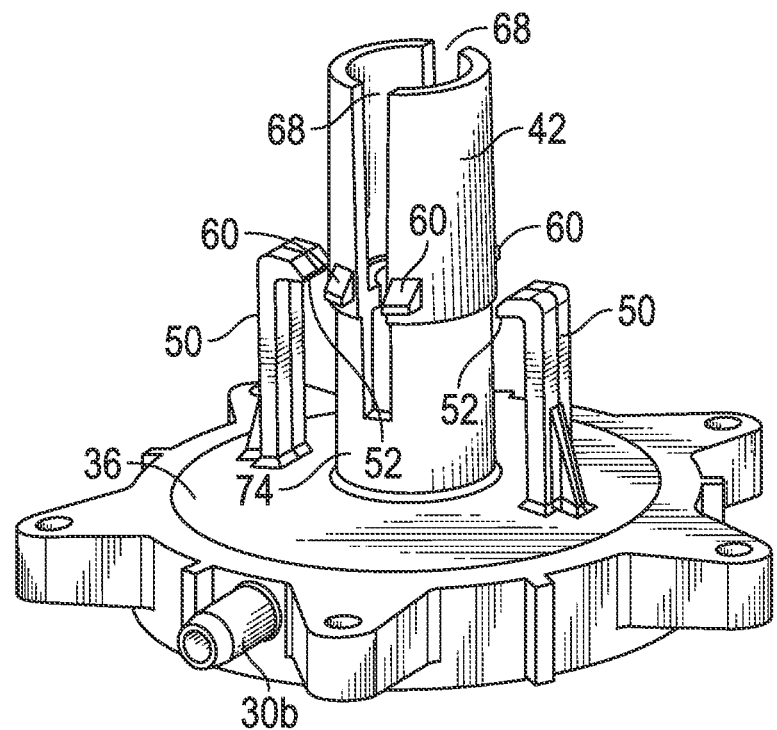
FIG. 4C illustrates an isometric view of the upper housing illustrated in FIG. 4A with several elements omitted for clarity.

Additional details of the upper housing 36 are illustrated in FIGS. 4A-4C. FIG. 4A illustrates a front view of the upper housing illustrated in FIG. 3A with several elements omitted for clarity. FIG. 4B illustrates a side view of the upper housing illustrated in FIG. 4A with several elements omitted for clarity. FIG. 4C illustrates an isometric view of the upper housing illustrated in FIG. 4A with several elements omitted for clarity. These Figures will be described in conjunction with one another.

Upper housing 36 can include a stem area 42, one or more stops 60, and a stem support 74. Referring to a side view of upper housing 36 (e.g., FIG. 4B), stem support 74 can further include slot 68. For example, slot 68 can include a portion of stem area 42 that is cut away or removed from the remainder of stem area 42. Stem support 74 can include a support or other brace, foundation, or fixture for supporting stem area 42. Stem support 74 can take the form of various shapes and sizes. For example, in an exemplary and non-limiting illustrative embodiment, stem support 74 can take the form of a cylinder with a uniform radius and with its height extending orthogonally along an axis away from upper housing 36. Other configurations, such as other geometric shapes and sizes for stem support 74, are contemplated as well.

Further extending away from upper housing 36 are one or more flexible tabs 50, each including one or more catches 52. Catch 52 can include any guide, hook, loop, or other device for catching, receiving, guiding, holding, or restraining the spring cap 48 (as shown in FIG. 6B) and second shoulder 54 (as shown in FIG. 6B) as will be described in greater detail below. As the position of plunger 76 adjusts with respect to upper housing 36 (i.e., moves towards or away from upper housing 36), flange 62—when disposed between the outer edges of slot 68—can slide along the channel formed by the slot 68 in order to restrict the plunger's 76 degrees of freedom of movement. That is, the plunger's 76 movement can be limited to movement along a vertical axis with respect to the upper housing 36. This movement is described in greater detail below.

Further, upper housing 36 can include housing pressure tap 30b. As described in greater detail below, housing pressure tap 30b can be used to measure pressure P2 in inlet plenum 24 (as shown in FIG. 2A) and compare it with pressure P1 as measured by housing pressure tap 30a (e.g., FIG. 3A) disposed on or coupled to lower housing 38 (e.g., FIG. 3A) as described in greater detail below.

Figure 5A:
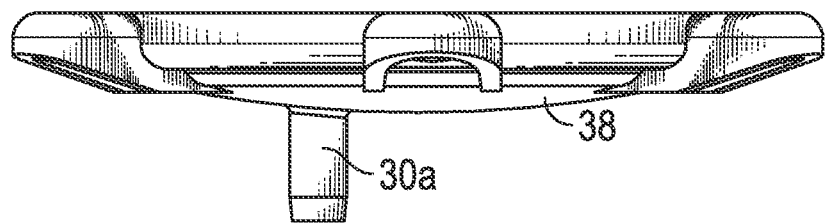
FIG. 5A illustrates a front-side view of the lower housing illustrated in FIG. 3A.
Figure 5B:
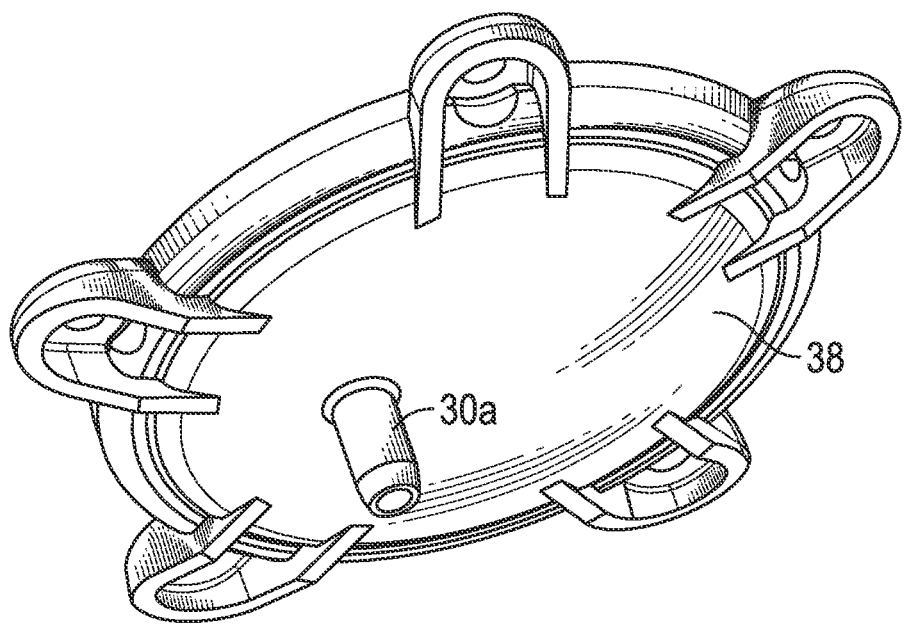
FIG. 5B illustrates an isometric view of the lower housing illustrated in FIG. 3A.

Additional details of the lower housing 38 are illustrated in FIGS. 5A and 5B. For example, FIG. 5A illustrates a front-side view of the lower housing illustrated in FIG. 3A, and FIG. 5B illustrates an isometric view of the lower housing illustrated in FIG. 3A. These Figures will be described in conjunction with one another.

Lower housing 38 can be formed separately with the housing pressure tap 30a, or in the alternative, it can be formed (such as through injection molding or other molding-type manufacturing processes) as a single, monolithic unit. The lower housing 38 can take various shapes and sizes. For example, lower housing 38 can take the shape of flat disc, plate, or other shape adapted to secure membrane 40 (as shown in FIG. 3A) between it and upper housing 36 (as shown in FIG. 3A).

Returning to FIGS. 3A-3D, Membrane 40 can be disposed between upper housing 36 and lower housing 38. Membrane 40 can include a flexible diaphragm, dividing membrane, or any other sheet, disk, or the like adapted to adjust its position (i.e., flex) when exposed to a pressure differential between its upper and lower portions. In one example, membrane 40 can be disposed in a configuration such that only the outer perimeter of membrane 40 is coupled to the upper housing 36 and lower housing 38, thus permitting the portions (such as, for example, inner portions) of membrane 40 to flex freely in a direction towards the upper housing 36, the lower housing 38, or both. For example, in this configuration, the center section of membrane 40 can flex upward or downward depending on the pressure differential between pressure P1 and pressure P2.

Referring to the "normal" operating conditions described above, when the drum 22 (as shown in FIG. 1A) has collected little or no water), P1 is approximately equal to P2. When P1 equals P2, pressure P1 will exert a pressure on the lower portion of membrane 40 and pressure P2 will exert a pressure on the upper portion of membrane 40 at particular magnitudes that are approximately equal. Thus, under "normal" operating conditions, membrane 40 will remain in its "normal," unflexed position (i.e., neither will be flexing towards the upper housing 36 nor towards the lower housing 38). This particular configuration is specifically illustrated in FIG. 3A.

The upper housing 36 can further include a stem area 42 that can further include a first shoulder 46. The stem area 42 can further include a biasing device 44, such as a spring (e.g., compression spring), or other device for storing and releasing compressive and/or elastic forces. In one particular configuration, the biasing device 44 can rest against one side of the first shoulder 46 while the opposite side of the biasing device 44 can be pressed against spring cap 48. Although spring cap 48 can be employed to restrain the movement of the biasing device 44 while biasing device 44 is embodied as a spring, other biasing devices—other than a spring—are contemplated as well. In those alternative embodiments, spring cap 48 can be equally employed to restrain biasing device 44.

Figure 6A:
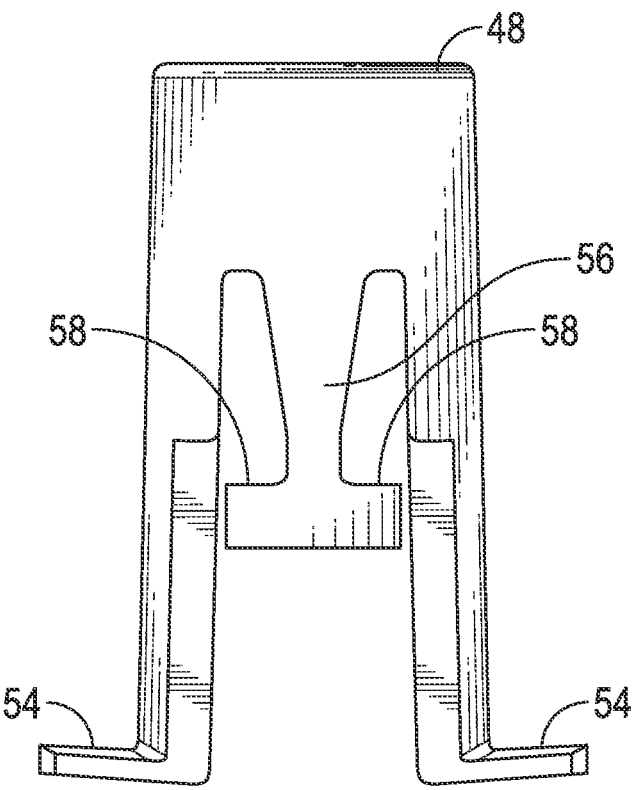
FIG. 6A illustrates a side view of the spring cap illustrated in FIG. 3A.
Figure 6B:
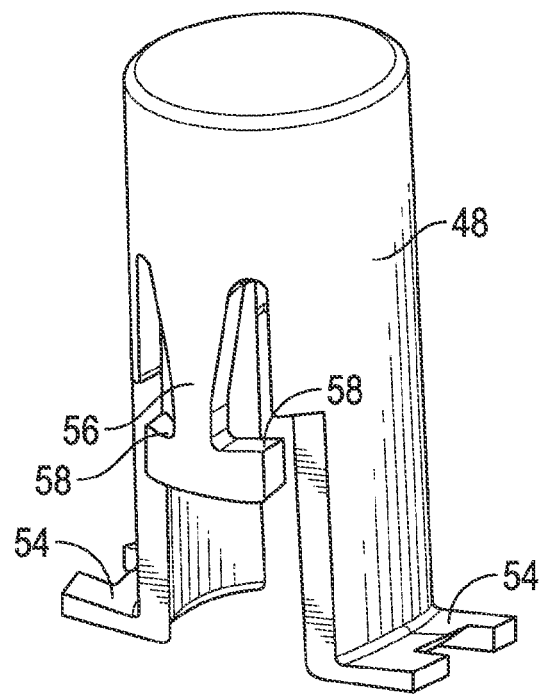
FIG. 6B illustrates an isometric view of the spring cap illustrated in FIG. 3A.

Additional details of spring cap 48 (and select related components) are illustrated in FIGS. 6A and 6B. FIG. 6A illustrates a side view of the spring cap illustrated in FIG. 3A. FIG. 6B illustrates an isometric view of the spring cap illustrated in FIG. 3A. These Figures will be described in conjunction with one another.

Spring cap 48 can include second shoulder 54, flexible member 56, and third shoulder 58. These components can be formed separately and coupled together, or in the alternative, they can be formed as a single unit, such as through a molding-based manufacturing process. These components can be formed from plastic, metal, composite, or another material. For example, flexible member 56 can be formed from an injection molded plastic such that it is adapted to flex towards and away from spring cap 48 to hold spring cap 48 in place as described in greater detail below. Second shoulder 54 can be coupled to an edge (e.g., a terminating edge) of spring cap 48 in order to couple to and decouple from flexible tabs 50 (as shown in FIG. 3C).

Second shoulder 54 can be configured to resist flexing as the spring cap 48 adjusts its position. In this configuration, flexible tabs 50 (as shown in FIG. 3C), rather than second shoulder 54, can adjust their position to couple to and decouple from second shoulder 54 in order to secure the position of spring cap 48. Moreover, third shoulder 58 can be coupled to a terminating edge of flexible member 56 such that as flexible member 56 flexes towards and away from spring cap 48, and third shoulder 58 can coupled to and decouple from stops 60 (as shown in FIG. 3C) and described in greater detail below.

Returning to FIGS. 3A-3D, spring cap 48 can be disposed such that it fits over stem 42, for example, though a sliding configuration. Further, spring cap 48 can be coupled to and secured and/or held on to stem area 42 through the aid of flexible tabs 50 of the upper housing 36. For example, as the spring cap 48 is installed, the flexible tabs 50 can adjust their position such that they clear or flex their way out of the second shoulder 54. As the installation process is continued and spring cap 48 is moved further downward along stem 42, catches 52 of the flexible tabs 50 "snap over" or position themselves over second shoulders 54, such that catches 52 create an abutment against second shoulders 54 and, thus, retaining spring cap 48 onto stem 42.

The flexible members 56 can be used to secure and hold spring cap 48 in a "cocked" position during "normal" vacuum operation. When in this "cocked" position, spring cap 48 compresses biasing device 44, and is secured by third shoulder 58 of the flexible members 56 and is coupled to—for example, abutting against—stops 60 on stem area 42 of upper housing 36. Therefore, when spring cap 48 is pushed down toward this "cocked position," flexible members 56 can flex over stops 60 and "snap" into the "cocked" position.

Below the stem area 42 of the upper housing 36 is a stem support 74. Stem support 74 can be used to install plunger 76 on the stem support so that plunger 76 can vertically traverse the stem support 74 (for example, through a sliding motion upwardly and downwardly with respect to the stem support 74). In this example, flange 62 can move up and down within slots 68 of the stem area 42. When P2 is less than P1 (for example, when drum 22 (as shown in FIG. 1A) fills with liquid and float 20 (e.g., FIG. 1A) contacts inlet plenum 24 (e.g., FIG. 1A)), membrane 40 flexes upwards towards upper housing 36 and against plunger 76. This configuration is illustrated in particular by FIG. 3B. Disposed on a portion of the plunger 76 (e.g., on the top portion) is a flange 62. Although depicted in the Figures as two separated parts (e.g., FIG. 3B), plunger 76 and flange 62 can be configured as a single monolithic structure or component. In one example, these two components can be molded and/or formed as one, single component.

Figure 7:
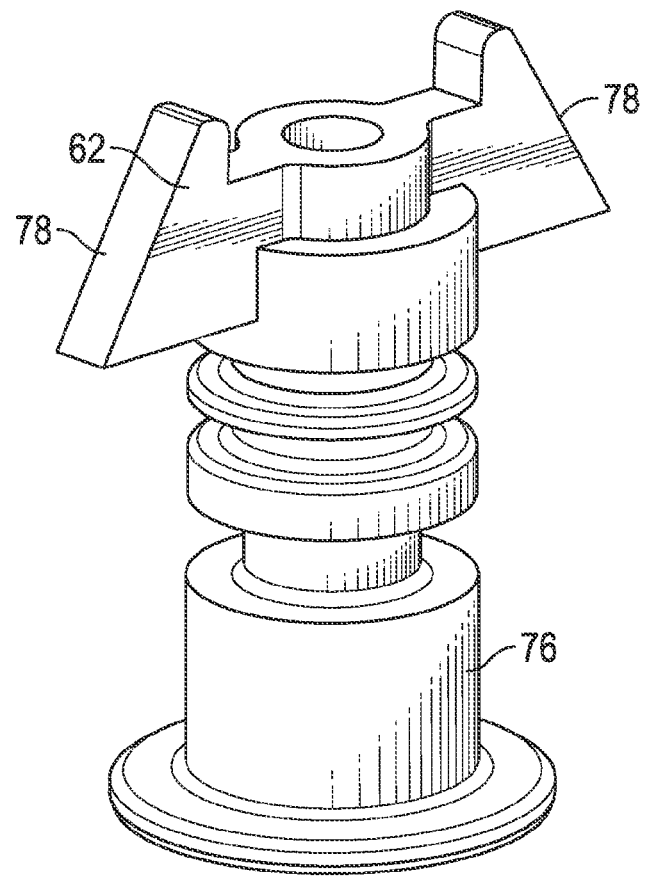
FIG. 7 illustrates an isometric view of the plunger and flange illustrated in FIG. 3A.

Additional details of the plunger 76 and flange 62 are illustrated in FIG. 7. FIG. 7 illustrates an isometric view of the plunger and flange illustrated in FIG. 3A. Flange 62 can include any tab, projection, protuberance, lip, or the like. For example, flange 62 can include one or more projections extending away from a surface of plunger 76. Flange 62 can include flange surface 78 that can be adapted to make contact with flexible members 56 (as shown in FIG. 3B) for releasing spring cap 48 from the "cocked position" (as shown in FIG. 3B) and described in greater detail below.

Returning to FIGS. 3A-3D, as upper portion of membrane 40 contacts the lower portion of plunger 76, the plunger 76 rises and thus, flange 62 is caused to rise upwardly with respect to housing 32. As flange 62 rises, flange surface 78 of the flange 62 contacts the flexible members 56 of spring cap 48 (e.g., abuts against spring cap 48) and forces the flexible members 56 of the spring cap 48 in an outwardly direction. As these flexible members 56 flex outward, third shoulders 58 are moved outwardly such that they disengage from the stops 60, thus releasing the spring cap 48 from its "cocked" position. (see, e.g., FIGS. 3B and 3C). Once disengaged, the biasing device 44 can force the spring cap 48 upwardly thus contacting the actuator 64 (e.g., abutting actuator 64) moving it to an "off" position.

As the actuator 64 moves to the "off" position, it forces power switch 66 to move from an "on" position to an "off" position. Once disposed in the "off" position, the power supply to the vacuum's motor (not shown) is disrupted (i.e., de-energized), thus the vacuum 10 (as shown in FIG. 1A) is turned off. The actuator 64 can be disposed at least partially on the exterior of the drum 22 (e.g., FIG. 1A) so that a user can access and/or manipulate the actuator 64 without opening or removing any components from the vacuum 10 (as shown in FIG. 1A).

FIG. 3D depicts the vacuum 10 (e.g., FIG. 1A) in the "off" position. Notably, the actuator 64 has forced the power switch 66 to this "off" position as a result of the releasing of the spring cap 48 that was forced in the direction of the actuator 64 as the compression in the biasing device 44 was released. Once the spring cap 48 is released, it is disposed in the "un-cocked" position as depicted in FIG. 3D.

Referring back to FIG. 1A, with the vacuum 10 in the "off" position, a user may more easily removed the liquid from the drum 22 to dispose of its contents. Once removed, the float 20 will return to a position such that it does not contact inlet plenum 24, thus minimizing the pressure differential between pressure P1 and pressure P2 when the vacuum 10 is energized. When the user wishes to turn the vacuum 10 back to the "on" position, the user can manually manipulate the position of the actuator 64 (by moving the actuator from the "off" position as shown in FIG. 3D to the "on" position as shown in FIG. 3A). That is, by physically repositioning the actuator 64, the power switch 66 can similarly be repositioned to control the power supply to the vacuum 10.

Referring again to FIGS. 3A-3D, as the user repositions the actuator 64, the configurations of the spring cap 48, the flexible members 56, and the like are reversed from the process described above. In other words, as the actuator 64 contacts and/or abuts against the spring cap 48, it forces it downward. Moreover, as the spring cap 48 is pushed down toward the "cocked" position, the biasing device 44 is compressed and flexible members 56 flex over stops 60. As this occurs, third shoulders 58 can "snap" over stops 60.

When in the spring cap 48 is in its "cocked" position, it can compress biasing device 44. The compressed biasing device 44 can remain compressed because it now, in its "cocked" position, is held down by third shoulders 58 of the flexible members 56 abutting against stops 60 on the stem area 42 of the upper housing 36. Once positioned in accordance with the configuration, spring cap 48 can remain in its position for "normal" vacuum operation because pressures P1 and P2 will remain approximately equal until such a time as the float 20 (e.g., FIG. 2A) contacts or approaches inlet plenum 24 (e.g., FIG. 2A) creating a pressure differential between pressure P1 and pressure P2.

Further, as spring cap 48 is pushed down, spring cap 48 contacts and/or abuts against flange 62, thus pushing plunger 60 in a downwardly direction. This repositioning allows plunger 60 to move freely back down to its "normal" resting position. As noted above, once drum 22 (e.g., FIG. 1A) is emptied, pressure P1 will be approximately equal to P2. Accordingly, membrane 40, without experiencing a significant pressure differential between its lower and upper surfaces, is free to return to its un-flexed position (as shown, for example, in FIG. 3A).

Referring specifically to FIG. 3A, housing 32 can be disposed at various locations on vacuum 10, such as at a location proximate to actuator 64 (i.e., to cause components associated with the housing 32 to adjust the actuator 64 to reposition the power switch 66 from the "on" to "off" positions). Further, the position of housing 32 (and its related components) can be adjusted through the aid of the mounting boss 70 and mounting coupler 72. Mounting boss 70 can include an area or void for receiving the mounting coupler 72. Mounting coupler 72 can include a screw, snap, hook, button, catch, clasp, bolt, or any other fastener for coupling a portion of vacuum 10 to housing 32 to secure it in place. With the aid of these components, the housing 32 can be secured to or coupled with the vacuum 10 at various locations (e.g., on the lid (not shown)).

The vacuum cleaner 10 described in connection with FIGS. 1A-7 may be configured to take alternative forms and designs as well. For example, the vacuum 10 as disclosed in FIGS. 1A-7 can be configured in the alternative such that the power supplied to the vacuum cleaner can be controlled through the use of a micro switch 238 (e.g., FIG. 9A). In this configuration, the vacuum's 10 biasing device 44, spring cap 48, catch 52, actuator 64, etc. (as shown, for example, in FIG. 3A) can be omitted and replaced with a micro switch 238 (e.g., FIG. 9A) and other related components that can be used in conjunction to create a similar effect—i.e., turn off the power supply to the vacuum's 10 motor (not shown). In this modified configuration, the pressure differential between pressure P1 and pressure P2 (as described in conjunction with FIGS. 1A-7, can be used to trigger the micro switch 238 and raise a reset shaft 214 (e.g., FIG. 9A) used to turn off the power supply to the vacuum's 10 motor (not shown). These particular embodiments may be better understood with reference to FIGS. 8-13 in combination with the detailed description of specific embodiments presented herein.

For FIGS. 8-13, many, but not all, of the illustrated features of the described inventions share features with the embodiments described in FIGS. 1A-7, above. For example, referring specifically to FIG. 9A, the exemplary vacuum cleaner 110 illustrated in this Figure shares many common elements with the exemplary vacuum cleaner 10 in FIGS. 1A and 1B (e.g., motor cover 12, hose 14, powerhead 16, cage 18, float 20, drum 22, inlet plenum 24, etc.). All of these features are described in detail with reference to FIGS. 1A-7 and thus, in the interest of clarity and brevity, will not be repeated for the description for FIGS. 8-13.

Moreover, several features described with reference to FIGS. 1A-7 are illustrated in one or more of FIGS. 8-13, but not specifically labeled for these embodiments. One of ordinary skill in the art, therefore, would understand that similar features illustrated in FIGS. 8-13 share common features, descriptions, embodiments as those features illustrated and described with reference to FIGS. 1A-7. Although the portions of the disclosure describing FIGS. 8-13 mainly focus on the differences of those elements previously described with reference to FIGS. 1A-7, one of ordinary skill in the art would recognize that one or more of the elements described in reference to FIGS. 8-13 can be similarly embodied, where appropriate, as those elements described in reference to FIGS. 1A-7.

Figure 8:
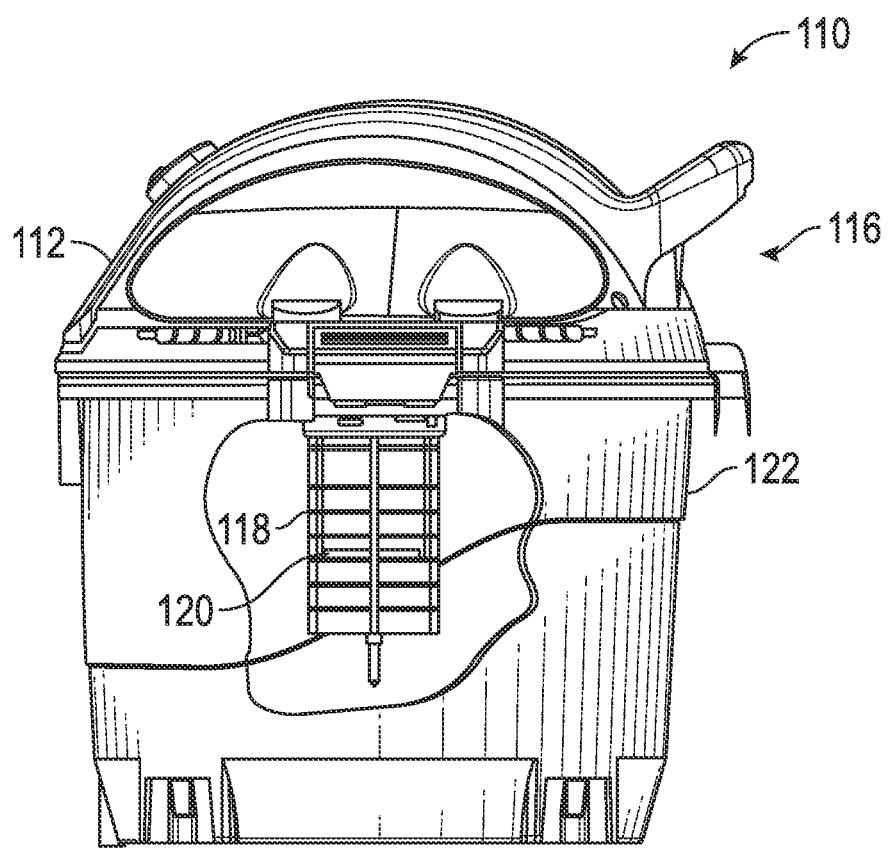
FIG. 8 illustrates a schematic side view of a second embodiment of an exemplary vacuum cleaner of the present disclosure with the filter removed for clarity.
Figure 9A:
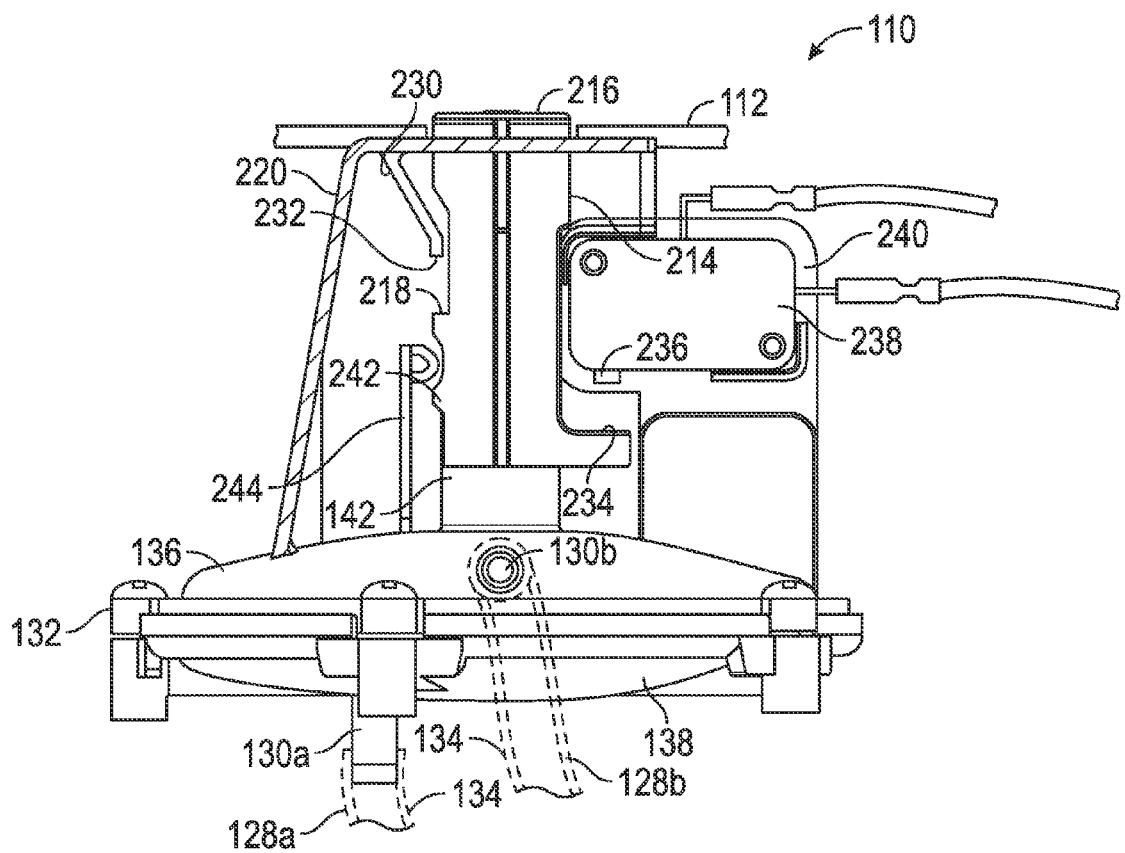
FIG. 9A illustrates an enlarged schematic side view of a second embodiment of an exemplary vacuum cleaner of the present disclosure with several elements omitted for clarity.
Figure 9B:
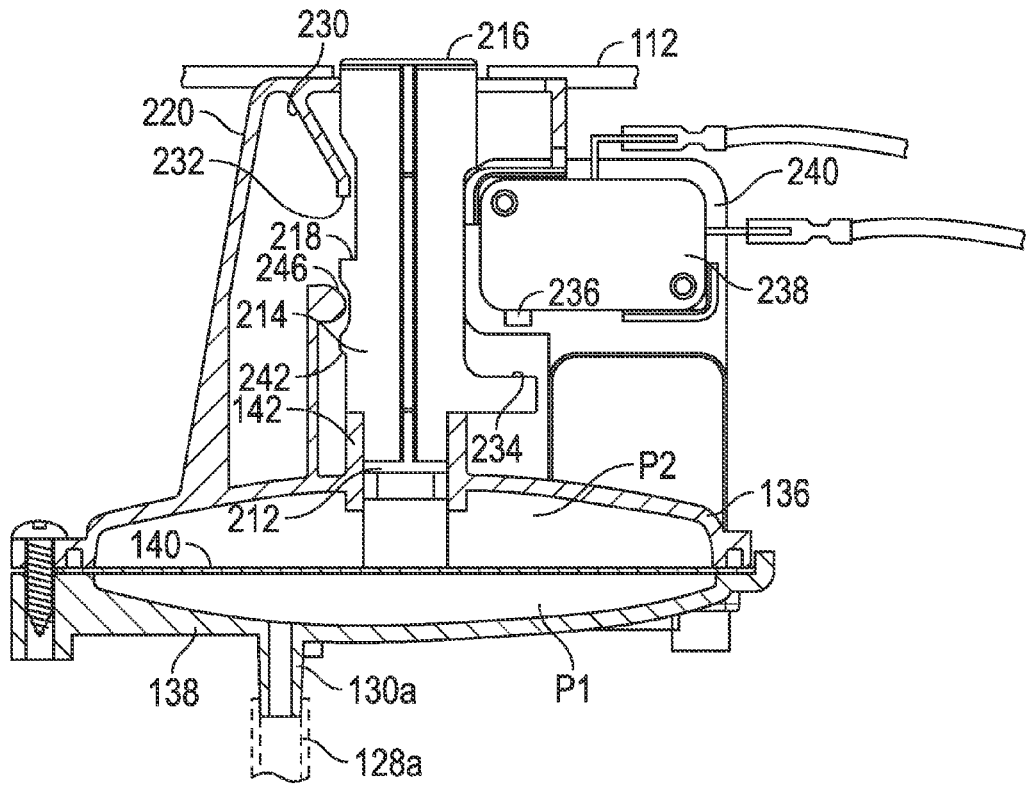
FIG. 9B illustrates a section view of the vacuum cleaner of FIG. 9A with the switch and reset shaft not sectioned for clarity and in an exemplary configuration where pressure P1 is approximately equal to pressure P2.
Figure 9C:
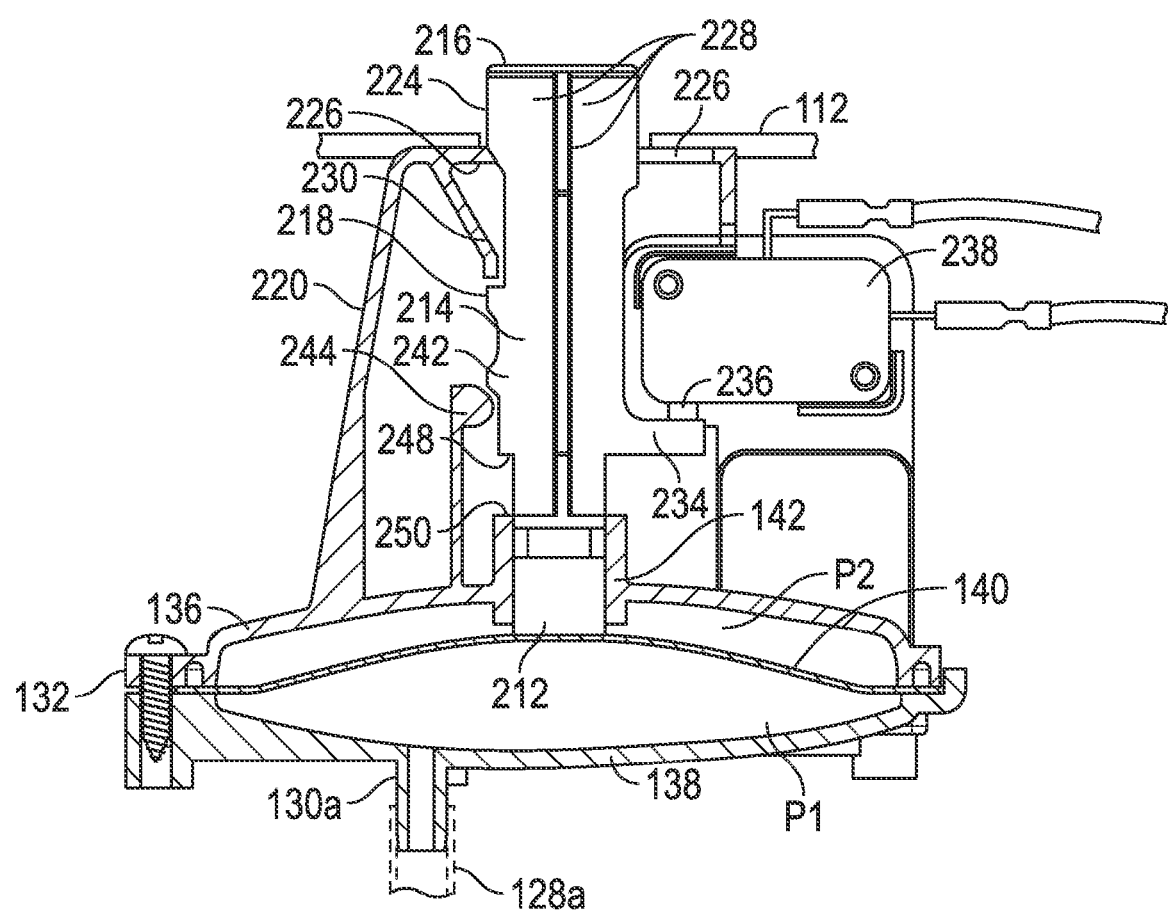
FIG. 9C illustrates a section view of the vacuum cleaner of FIG. 9A with the switch and reset shaft not sectioned for clarity and in an exemplary configuration where pressure P1 is greater than pressure P2.

FIG. 8 illustrates a schematic side view of a second embodiment of an exemplary vacuum cleaner of the present disclosure with the filter removed for clarity. FIG. 9A illustrates a schematic side view of a second embodiment of an exemplary vacuum cleaner of the present disclosure. FIG. 9B illustrates a section view of the vacuum cleaner of FIG. 9A with the switch and reset shaft not sectioned for clarity and in an exemplary configuration where pressure P1 is approximately equal to pressure P2. FIG. 9C illustrates a section view of the vacuum cleaner of FIG. 9A with the switch and reset shaft not sectioned for clarity and in an exemplary configuration where pressure P1 is greater than pressure P2. These Figures will be described in conjunction with one another.

In addition to many of the components described in FIGS. 1A and 1B above with reference to vacuum 10, vacuum 110 can further include conduit 134 (that can be more specifically labeled first conduits 128a and 128b) and housing pressure taps 130a and 130b. The first conduits 128a and 128b and housing pressure taps 130a and 130b can be used in conjunction with one another, along with the movement of the float 120 as it rises to contact the inlet plenum (not shown) to create and measure a pressure differential with the vacuum 110. More specifically, as liquid enters the drum 122, the liquid falls to the bottom of the drum 122 as it collects debris. As the drum 122 collects liquids, the float 120, being configured to be more buoyant than the liquid collected in the drum 122, will rise with the liquid being collected. As the float 120 contacts the inlet plenum (not shown), the vacuum inside the drum 122 is interrupted, thus creating a pressure differential between the drum 122 and inlet plenum (not shown). This pressure differential is measured, in part, through the aid of the above-referenced taps.

For example, first conduit 128a can be coupled to housing pressure tap 130a at a location that is disposed below the lower surface of membrane 140. In this location, housing pressure tap 130a can sense the pressure P1 inside drum 122. Further, first conduit 128b can be coupled to housing pressure tap 130b at a location that is disposed above the upper surface of membrane 140. In this location, housing pressure tap 130b of upper housing 136 can sense the pressure P2 exerted on or near inlet plenum 24—i.e., inside the inlet plenum 24.

When the vacuum 110 is operating under "normal" operating conditions (i.e., the drum 122 has collected little or no water) P1 is approximately equal to P2. That is, without the float 120 partially covering or fully covering inlet plenum (not shown), air may flow freely between the inlet plenum (not shown) and the drum 122, thus equalizing the pressure differential. The pressure P1 and pressure P2, therefore, typically equal one another under "normal" operating conditions.

As the drum 122 collects liquids and the float 120 rises, eventually pressure P2 will fall below that of P1 because the float 120 will partially cover or fully cover the inlet plenum (not shown) as it rises in the drum 122 to meet it. That is, the airflow between the inlet plenum (not shown) and the drum 122 is impeded. Once this occurs, pressure P2 (which remains in a vacuum condition) will be less than pressure P1 (which now increase to, at, or near atmospheric pressure after the float 120 fully contacts and covers the inlet plenum (not shown)), thereby causing a pressure differential between pressures P1 and P2.

The pressure P1 and pressure P2 are measured through taps connected to or coupled with the housing 132 (as described in greater detail in conjunction with FIGS. 8-9C) through first conduits 128a and 128b. These first conduits, when described together, can be referred to collectively as conduit 134. Conduit 134, for example, can include a hose, tubing, or any other type of conduit to allow the flow of air from one point to another. Furthermore, any tubing or conduit that can withstand collapse under typical pressures exerted within vacuum 110 can be used to aid the housing's 132 to measurement and/or detection of a pressure differential between pressure P1 and pressure P2.

The housing 132 can be disposed at any location on the motor cover 112 to allow a user the ability to access the reset surface 216 (as discussed in greater detail below) from an exterior surface of drum 122. Further, the housing 132 can include an upper housing 136 and a lower housing 138. The upper housing 136 and the lower housing 138 can include the housing pressure taps 130b, and 130a, respectively.

Figure 11A:
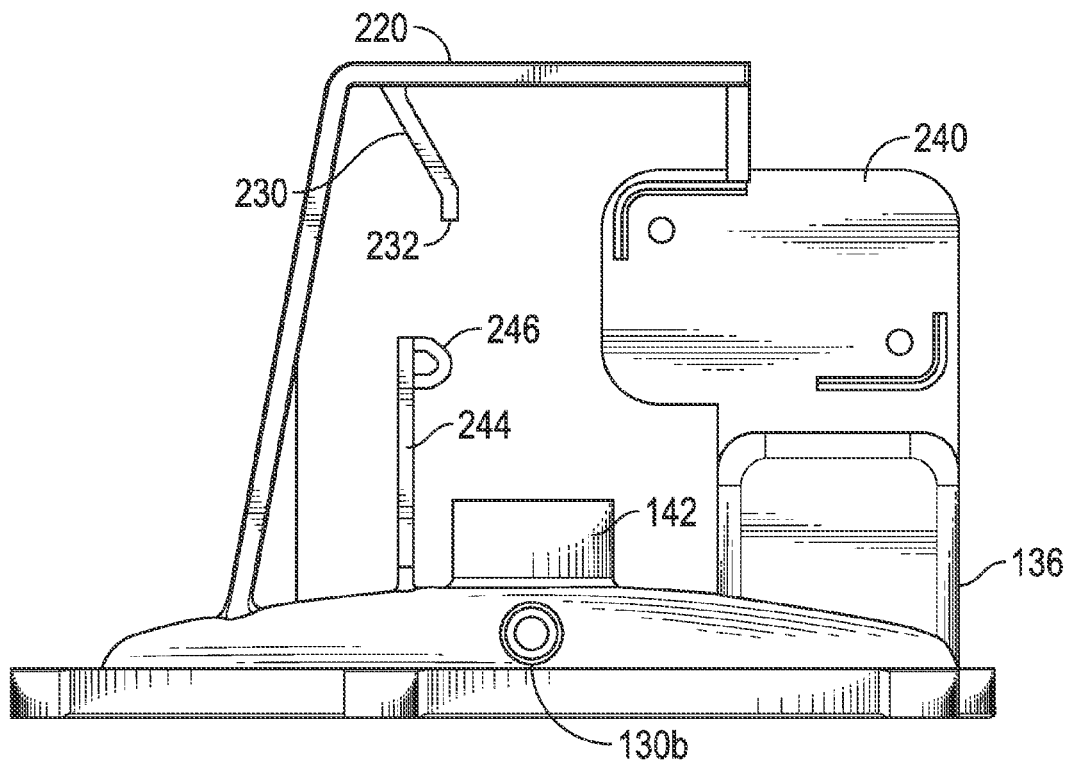
FIG. 11A illustrates a side view of the upper housing illustrated in FIG. 9C.
Figure 11B:
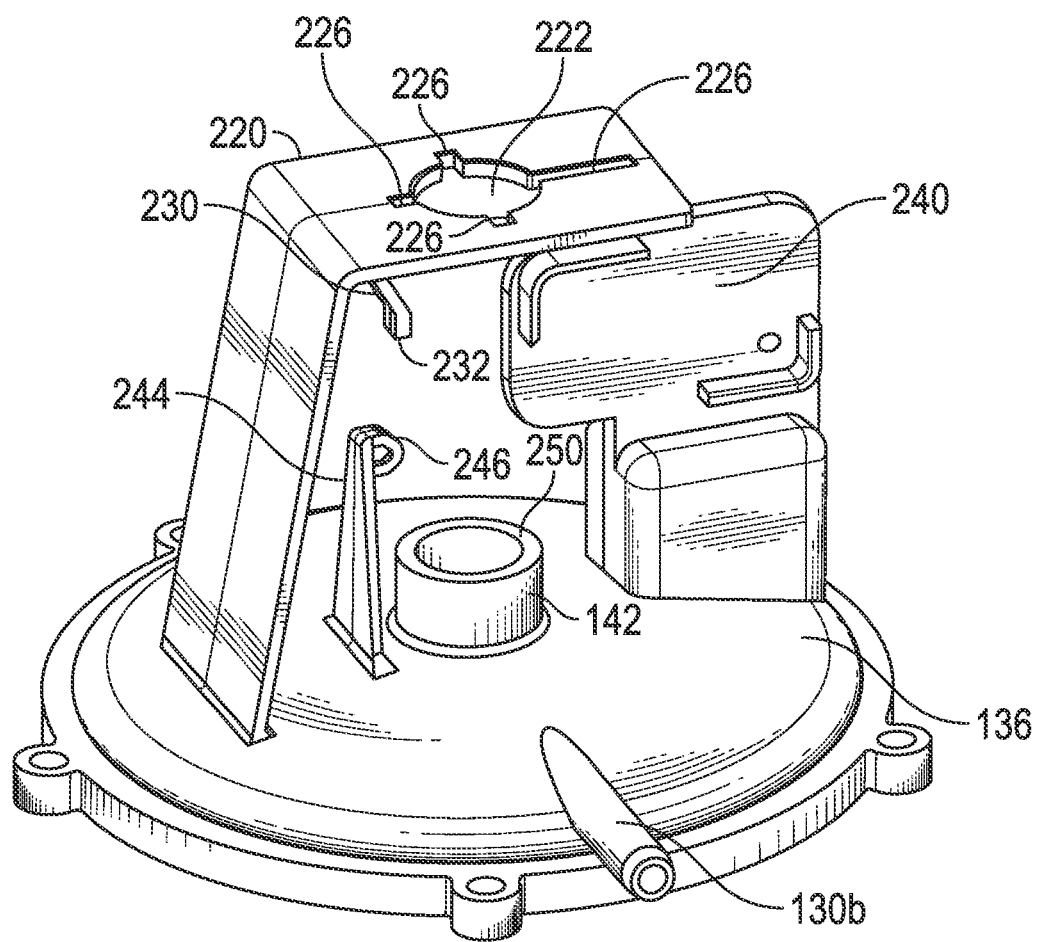
FIG. 11B illustrates a left isometric view of the upper housing illustrated in FIG. 9C.
Figure 11C:
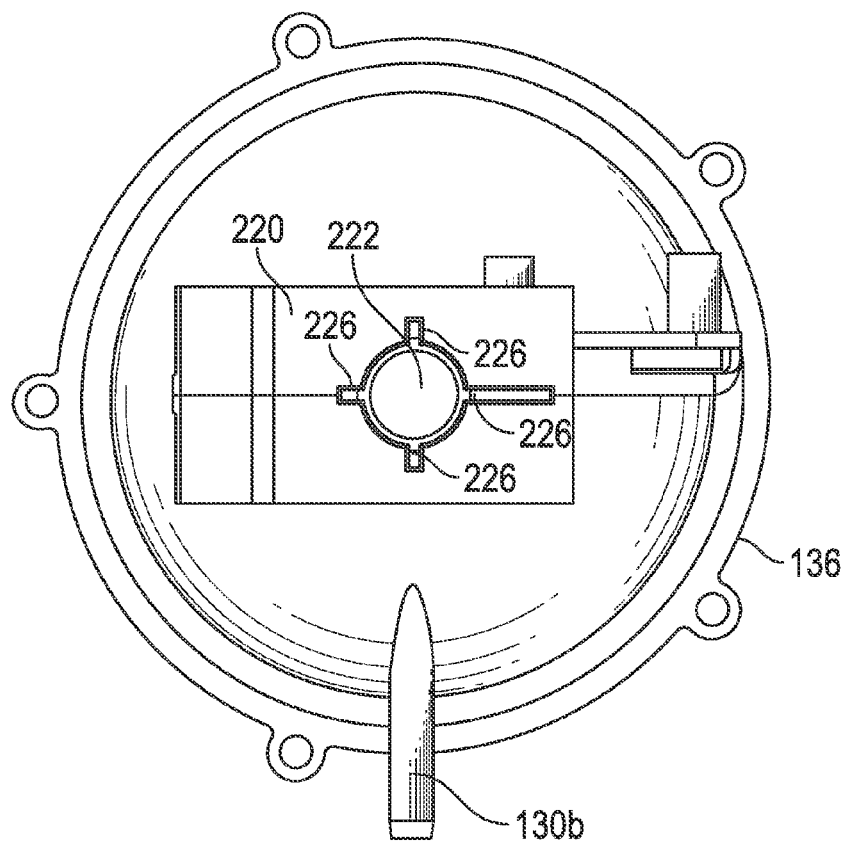
FIG. 11C illustrates a top view of the upper housing illustrated in FIG. 9C.
Figure 11D:
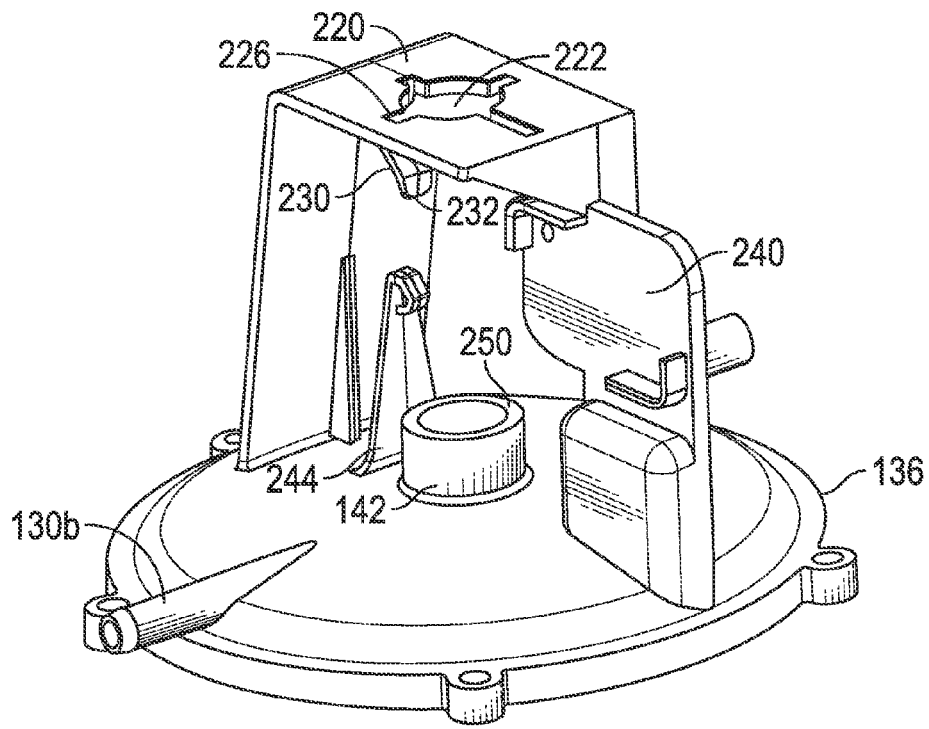
FIG. 11D illustrates a right isometric view of the upper housing illustrated in FIG. 9C.

Additional details of the upper housing 136 are illustrated in FIGS. 11A-11D. FIG. 11A illustrates a side view of the upper housing illustrated in FIG. 9A. FIG. 11B illustrates a left isometric view of the upper housing illustrated in FIG. 9A. FIG. 11C illustrates a top view of the upper housing illustrated in FIG. 9A. FIG. 11D illustrates a right isometric view of the upper housing illustrated in FIG. 9A. These Figures will be described in conjunction with one another.

Upper housing 136 can include a stem support 142, support area 220, and flexible stop member 230 that can include flexible stop member surface 232. Further, upper housing 136 can include flexible holding member 244 that can include a surface of flexible holding member 246. Referring specifically to FIGS. 11B and 11D, upper housing 136 can further include micro switch mounting area 240, one or more slots 226 and bearing area 222 disposed on or near support area 220, and surface of stem area 250. Switch mounting area 240 can include any brace, bracket, support, or other fixture for supporting micro switch 238.

The one or more slots 226 can define a portion of support area 220 that is cut away or removed from the remainder of support area 220. Support area 220 can include a support or other brace, bracket, foundation, or other fixture for supporting one or more features of upper housing 136, such as, for example, flexible stop member surface 232. Stem support 142 can take the form of various shapes and sizes. For example, in an exemplary and non-limiting illustrative embodiment, stem support 142 can take the form of a cylinder with a uniform radius with its height extending orthogonally along an axis away from upper housing 136. Other configurations for stem support 136 are contemplated as well (such as other regular or non-regular geometric shapes).

Figure 10A:
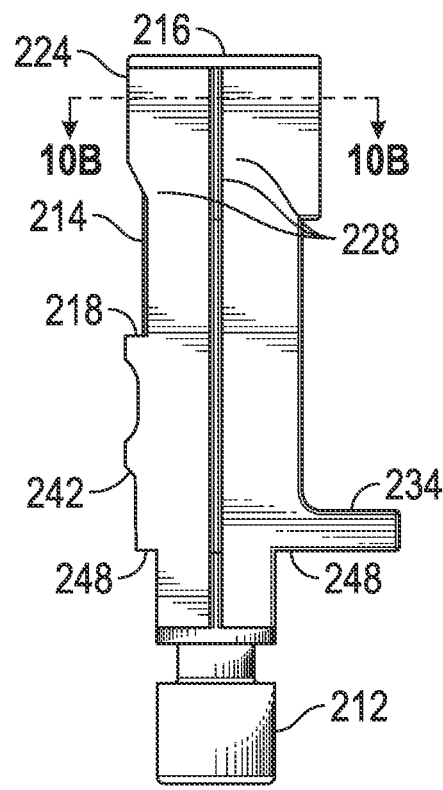
FIG. 10A illustrates a side view of the reset shaft illustrated in FIG. 9C.
Figure 10B:
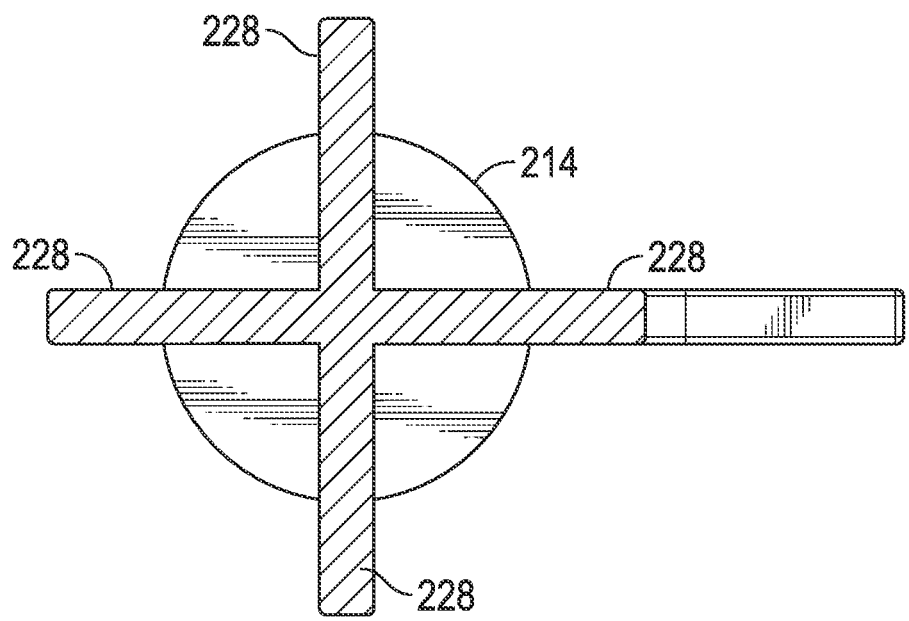
FIG. 10B illustrates a section view of the reset shaft illustrated in FIG. 9C taken along section line A-A of FIG. 10A.
Figure 10C:
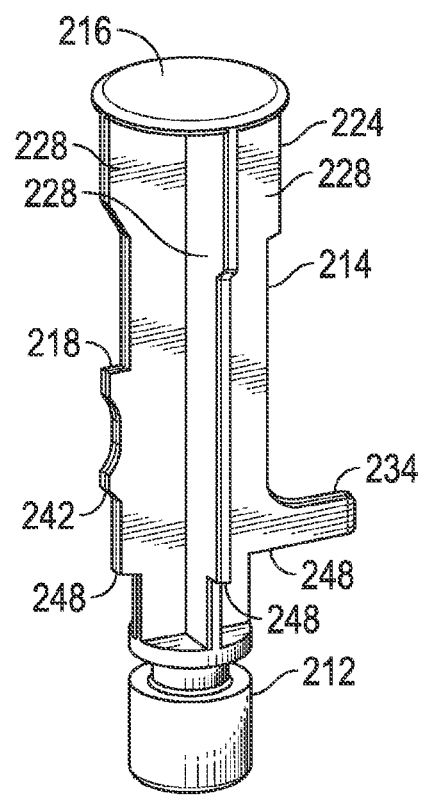
FIG. 10C illustrates an isometric view of the reset shaft illustrated in FIG. 9C.

One or more slots 226 and bearing area 222 can form a cut-away section of support area 220 for receiving reset shaft 214 (as shown in FIG. 10C). For example, reset shaft 214 may be slidably received through one or more slots 226 and bearing area 222, and seated within or coupled to stem support 142 so that a bottom portion of reset shaft 214 can be coupled to (i.e., abut) the surface of stem support 250. As the reset shaft 214 adjusts its position with respect to upper housing 136 (for example, as it moves towards and away from the upper surface of upper housing 136), the walls of reset shaft 228 (as shown in FIG. 10C) move in a direction such that they remain adjacent to slots 226. This movement is described in greater detail below.

As reset shaft 214 (e.g., as shown in FIG. 10C) adjusts its position through one or more slots 226 and bearing area 222, flexible stop member 230 and flexible holding member 244 can adjust their positions through flexing such that flexible stop member surface 232 and surface of flexible holding member 246 can be coupled to and decoupled from portions of reset shaft 214 to prevent its movement in one or more directions. These features are described in greater detail below.

Further, upper housing 136 can include housing pressure tap 130b. As described in greater detail below, housing pressure tap 130b can be used to measure a pressure P2 in inlet plenum (not shown) and compare it with pressure P1 as measured by housing pressure tap 130a (e.g., FIG. 9A) disposed on or coupled to lower housing 138 (e.g., FIG. 9A) as described in greater detail below.

Figure 12A:
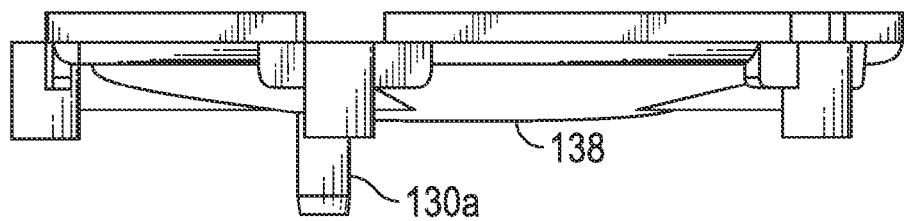
FIG. 12A illustrates a side view of the lower housing illustrated in FIG. 9C.
Figure 12B:
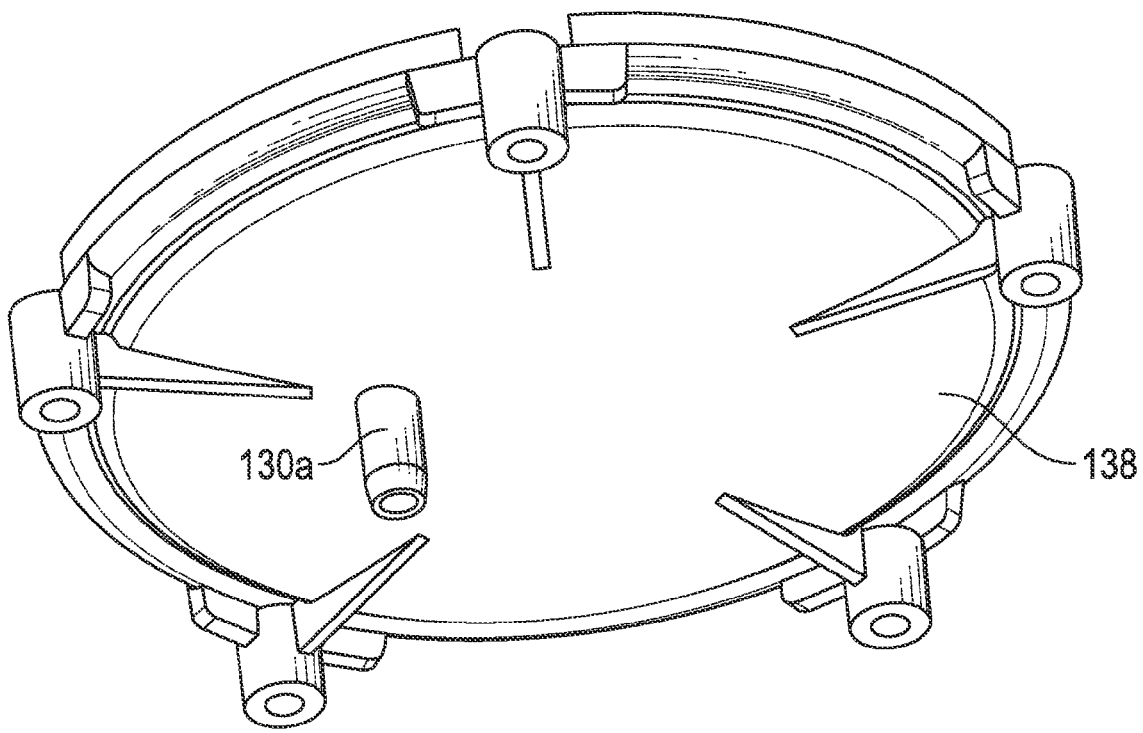
FIG. 12B illustrates an isometric view of the lower housing illustrated in FIG. 9C.

Additional details of the lower housing 138 are illustrated in FIGS. 12A and 12B. For example, FIG. 12A illustrates a side view of the lower housing illustrated in FIG. 9A. FIG. 12B illustrates an isometric view of the lower housing illustrated in FIG. 9A. These Figures will be described in conjunction with one another.

Lower housing 138 can be formed separately with the housing pressure tap 130a, or in the alternative, it can be formed (such as through injection molding or other molding-type manufacturing process) as a single, monolithic unit. The lower housing 138 can take various shapes and sizes. For example, lower housing 138 can take the shape of flat disc, plate, or other shape adapted to secure membrane 140 (as shown in FIG. 9B) between it and upper housing 136 (as shown in FIG. 9B).

Returning to FIGS. 8-9C, membrane 140 can be disposed between upper housing 136 and lower housing 138. Membrane 140 can include a flexible diaphragm, dividing membrane, or any other sheet, disk, or the like adapted to adjust its position (i.e., flex) when exposed to a pressure differential between its upper and lower portions. In one example, membrane 140 can disposed in a configuration such that only outer perimeter of membrane 140 is coupled to the upper housing 136 and lower housing 138, thus permitting the inner portions of membrane 140 to flex freely in a direction towards the upper housing 136, the lower housing 138, or both. For example, in this configuration, the center section of membrane 140 can flex upward or downward depending on the pressure differential between pressure P1 and pressure P2.

The upper housing 136 can include a stem support 142. In one example, the stem support 142 is a cylindrically shaped area for supporting reset shaft 214, although other shapes, sizes, and configurations are contemplated as well. On one end of the reset shaft 214 can include a stem insert area 212. This stem insert area 212 can install the stem support 142, and be disposed such that it may move—for example through a sliding or gliding motion—in an upwardly and downwardly motion. A reset surface 216 can be disposed on the other end of the reset shaft 214 opposite to the end of the stem insert area 212. The reset shaft 214 can be employed as a reset button as will be described in greater detail below in conjunction with FIGS. 9C-10C.

FIG. 10A illustrates a side view of the reset shaft illustrated in FIG. 9C. FIG. 10B illustrates a section view of the reset shaft illustrated in FIG. 9C taken along section line A-A of FIG. 10A. FIG. 10C illustrates an isometric view of the reset shaft illustrated in FIG. 9C. These Figures will be described in conjunction with one another.

The reset shaft 214 can include a reset surface 216, reset surface end 224, first stop shoulder 218, stem insert area 212, walls of reset shaft 228, second stop shoulders 248, and holding shoulder 242. The reset shaft 214 can be implemented as a one-way design such that it can be configured to only move in a single direction—upwardly—without requiring the manual intervention from a user. In this configuration, the reset shaft 214 can still move in the downward direction, but as described in greater detail below, when configured with a one-way design, user intervention is required to ensure the reset shaft 214 is moved back in a downwardly direction.

The upper housing 136 (e.g., FIG. 9A) can further include a support area 220 (e.g., FIG. 9A) that can include a bearing area 222 (e.g., FIG. 11B) to provide upper support for, and allow sliding clearance for, the reset surface end 224 of the reset shaft 214.

The cross section of reset surface end 224 can be implemented in a plus-shaped ("+") configuration (e.g., as shown in FIG. 10B). In other embodiments, the reset shaft 214 can take other suitable forms as well. The plus-shaped design can serve multiple purposes. First, it can provide for molding-based manufacture so that it can be easily formed and manufactured as a single monolithic piece. Secondly, this configuration can resist against any rotation (e.g., twisting or turning) about its vertical axis (for example, referring specifically to FIG. 10C, the axis drawn from stem insert area 212 up to reset surface 216). To further resist this rotation, bearing area 222 can include slots 226 that correspond with the walls of reset shaft 228 of this plus-shaped configuration of the reset surface end 224. The slots 226 can contact (e.g., abut) against the walls of reset shaft 228 to keep the reset shaft 214 from rotating.

Referring to FIG. 9A in conjunction with FIGS. 10A-10C, support area 220 can include a flexible stop member 230. In this configuration, flexible stop member 230 can flex over first stop shoulder 218 and be secured (e.g., through a snap-like action) into its position as the first stop shoulder 218 moves—e.g., in a downwardly direction—past flexible stop member 230. In this configuration, the first stop shoulder 218 can prevent the reset shaft 214 from moving farther (e.g., in an outwardly or upwardly direction) as it contacts flexible stop member surface 232 of flexible stop member 230. That is, flexible stop member 230 will resist any further movement of reset shaft 214 because first stop shoulder 218 will be unable to move beyond flexible stop member surface 232 of flexible stop member 230. Reset shaft 214 can additionally resist movement in a downwardly direction as well. For example, reset shaft 214 can include second stop shoulders 248 that can contact (e.g., abut or bump up against) the surface of stem support 250 to limit the maximum distance reset shaft 214 can travel in a downwardly direction.

Disabling the Power Supply

Referring specifically to FIG. 9C, when pressure P2 is less than pressure P1 (e.g., in a similar manner as described in conjunction with FIGS. 1A-7), membrane 140, experiencing this pressure differential, can expand in the direction towards upper housing 136 and stem insert area 212. As membrane 140 expands and contacts insert area 212, insert area 212 also rises, which in turn, can cause reset shaft 214 to rise as well. As reset shaft 214 rises, micro switch shoulder 234 moves in an upwardly direction such that its upper edge contacts (e.g., bumps into and/or abuts) plunger actuator 236 of micro switch 238. In one example, micro switch 238 can include a snap-action switch, so that an electrical circuit within micro switch 238 can be disabled as the micro switch 238 is triggered (e.g., as the plunger actuator 236 moves in the direction of micro switch 238). In other words, as the micro switch shoulder 234 contacts the plunger actuator 236, it can cause the plunger actuator 236 to move inwardly (i.e., inboard) toward the body of micro switch 238.

Micro switch 238 can be coupled to the upper housing 136 (e.g., through mounting or other type of coupling) on the micro switch mounting area 240. As the plunger actuator 236 moves inwardly, it triggers the micro switch 238 by opening an electrical circuit (i.e., causes contacts of the electrical circuit contained within the micro switch 238 to open, thus interrupting the electrical current flowing to the main vacuum switch (not shown). This interruption in current, in turn, interrupts the electrical current flowing to the vacuum motor (not shown), thus turning the vacuum 110 off.

Figure 13:
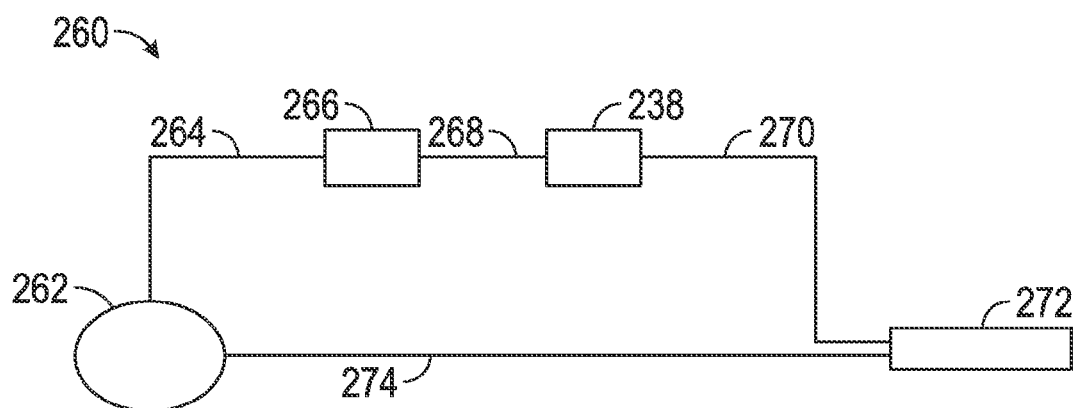
FIG. 13 illustrates a wiring diagram of a first embodiment of a wiring configuration of the micro switch to the vacuum cleaner of FIG. 9A.

FIG. 13 illustrates a wiring diagram of a first embodiment of a wiring configuration of the micro switch to the vacuum cleaner of FIG. 9A. The circuit 260 can include a vacuum motor 262, a first electrical conduit 264, a main vacuum switch 266, a second electrical conduit 268, a micro switch 238, a third electrical conduit 270, a power supply cord 272, and a fourth electrical conduit 274.

When vacuum motor 262 is energized, it can cause a blower wheel (not shown) to rotate. The vacuum motor 262 can include any device capable of converting electrical energy into mechanical energy. In the example illustrated in this Figure, the circuit 260 is designed as a "normally closed" circuit model. That is, vacuum motor 262 is powered unless one of the main vacuum switch 266 or micro switch 238 are open. As previously discussed, micro switch's 238 default configuration is in the closed position. That is, micro switch 238 will only be in the open position if acted upon by plunger actuator 236 (as shown in FIG. 9C). In this configuration (with micro switch's 238 default position as being "closed"), under "normal conditions," the main vacuum switch 266 can be used to energize or deenergize the vacuum motor 262 (i.e., turn on and off, respectively). However, as the plunger actuator 236 (e.g., FIG. 9C) contacts micro switch 238, micro switch 238 "opens," thus disrupting the current flow through circuit 260. This, in turn, will interrupt the electrical current flowing to the main vacuum switch 266, thus powering down the vacuum motor 262.

In this configuration, the components of circuit 260 are wired in series with main vacuum switch 266. For example, first electrical conduit 264 can be disposed between the vacuum motor 262 and the main vacuum switch 266. This conduit can carry a current load to ensure electrical continuity between the main vacuum switch 266 and vacuum motor 262. Second electrical conduit 268 can be disposed between the main vacuum switch 266 and micro switch 238. This conduit can carry a current load to ensure electrical continuity between these two elements. Third electrical conduit 270 can be disposed between the power supply cord 272 and micro switch 238. This conduit can carry a current load to ensure electrical continuity between these two elements. Lastly, fourth electrical conduit 274 can be disposed between the power supply cord 272 and vacuum motor 262. This conduit can help to complete the circuit between the power supply cord 272 and vacuum motor 262.

The four electrical conduits described above can include any wire, filament, cable, coil, line, or other electrically conductive strand for carrying current from one point on circuit 260 to another. For example, each of the four electrical conduits described above can include simple electrical wires for conducting electricity. Further, each of the switches described above can include any switch or toggle for either opening or closing an electrical circuit. For example, main vacuum switch 266 can be embodied as the main switch 66 (as shown in FIG. 3D), or in the alternative, main vacuum switch 266 can be embodied as any other switch capable of being positioned in either an "on" or "off" position. Power supply cord 272 can include any conduit for supplying power (either alternating current (AC) or direct current (DC)) from a power supply to the circuit 260. For example, power supply cord 272 can include a standard power supply cord adapted to be compatible with a standard 110V (or, in the alternative, 220V) electrical socket.

Referring again to FIG. 9A, as reset shaft 214 rises, reset surface 216 and holding shoulder 242 rise as well (e.g., FIG. 9C depicts an example of reset surface 216 after it has risen, for example, as a result of membrane 140 expanding and causing stem insert area 212 and reset shaft 214 to rise). After reset shaft 214 has risen, at least a portion of reset surface 216 can be disposed on an outer surface of a vacuum 110. Because at least a portion of reset surface 216 is now disposed on an outer surface of the vacuum 110, it can be accessible to a user to serve as a reset feature (e.g., reset button) that is held in place, in part, by the flexible holding member 244 located on the upper housing 136.

More specifically, as reset shaft 214 rises, it can cause flexible holding member 244 to expand and flex over holding shoulder 242. As a result, reset shaft 214 can be held into place after it flexes over holding shoulder 242 through a snapping-motion (i.e., it snaps into place and is securely held such that holding shoulder 242 can prevent movement in the downwardly direction). Once in this configuration, the surface of flexible holding member 246 contacts (e.g., abuts) against holding shoulder 242 and thus the reset shaft 214 is held in place in a "tripped" position. In other words, the reset shaft 214 is considered to be in a "tripped" position when the plunger actuator 236 causes the electrical circuit in the micro switch 238 to open the circuit and disrupt the flow of current in the micro switch 238. FIG. 9C illustrates an example of when the reset shaft 214 is in the "tripped" position.

Resetting the Power Supply

In order to return the flow of current to the vacuum motor (not shown), a user can depress the reset surface 216 in a downwardly direction to lower the reset shaft 214, causing the micro switch shoulder 234 to disengage contact from the plunger actuator 236, thus closing the electrical circuit within micro switch 238. In one example, the surface of flexible holding member 246 is specially angled, and thus, by depressing the reset surface 216, the position of flexible holding member 244 can be adjusted such that the flexible holding member 244 can flex out of the way of holding shoulder 242 and allow the reset shaft 214 to lower back down to its "normal" condition or configuration. In this configuration, the vacuum (not shown) has now been "reset." Typically, the user resets the vacuum (not shown) after the drum has been emptied (i.e., to restore the pressure differential between pressure P1 and pressure P2 such that they are approximately equal. Once "reset," the vacuum 110 can return to its "normal" operating condition.

Further, plunger actuator 236 of micro switch 238 can be biased, such as by including a spring-loaded device. In this configuration as the micro switch shoulder 234 lowers and decouples from the plunger actuator 236, the plunger actuator 236 can be forced back to its original position (i.e., moved away from micro switch 238) based on an internal biasing in the vertical direction. In this configuration, plunger actuator 236 can "snap-back" to its normal, resting condition. In another example, micro switch 238 can be configured such that it may return to its original position on its own by falling away from the micro switch 238 under the force of gravity. That is, if the switch shoulder 236 is not contacting the plunger actuator 236, the plunger actuator will be unable to resist the force of gravity and thus it will fall back to its original position. Once in its original, "normal" condition, the electrical circuit (not shown) contained within the micro switch 238 will close, thus allowing the flow of electrical current to the vacuum 110. As described in greater detail above, FIG. 13 describes how the position of the plunger actuator 236 can affect the flow of electrical current to the vacuum 110.

The vacuum cleaner 110 described in connection with FIGS. 8-13 may be configured to take alternative forms and designs as well. For example, the vacuum 110 as disclosed in FIGS. 8-13 can be configured in the alternative such that a pressure differential is created within the vacuum drum 122 by a volume of air trapped within an "air-trap" disposed within the drum 122. This increased pressure experienced within the air-trap is a result of the rising water stored in the drum. In this configuration, the vacuum's 110 float 120 (as shown in FIG. 8) and inlet plenum (not shown) can be omitted and replaced with an air-trap (e.g., air-trap 452a as shown in FIG. 14B) and other related components that can be used in conjunction with one another to measure a pressure differential created by rising liquid stored in the vacuum's drum 122. In this modified configuration, micro switch 238, reset shaft 214 and related components (as described, for example, in FIGS. 8-13) can be triggered and reset in a manner similar described in conjunction with FIGS. 8-13. However, in this particular embodiment, the triggering process can be a result of the pressure differential created by relatively pressurized air in an air-trap rather than based on a rising float as described in FIGS. 8-13. These particular embodiments may be better understood with reference to FIGS. 14A-15B in combination with the detailed description of specific embodiments presented herein.

For FIGS. 14A-15B, many, but not all, of the illustrated features of the described inventions share several features with the embodiments described in FIGS. 1-13, above. For example, referring specifically to FIG. 14A, the exemplary vacuum cleaner 310 illustrated in this Figure shares many common elements with the exemplary vacuum cleaner in FIGS. 1A and 1B (e.g., motor cover 12, hose 14, powerhead 16, cage 18, float 20, drum 22, inlet plenum 24, etc.). All of these features are described in detail with reference to FIGS. 1-13 and thus, in the interest of clarity and brevity, will not be repeated for the description for FIGS. 14A-15B.

Moreover, several features described with reference to FIGS. 8-13 are illustrated in one or more of FIGS. 14A-15B, but not specifically labeled for these embodiments. One of ordinary skill in the art, therefore, would understand that similar features illustrated in FIGS. 14A-15B share common features, descriptions, embodiments as those features illustrated and described with reference to FIGS. 8-13. Although the portions of the disclosure describing FIGS. 14A-15B mainly focus on the differences of those elements previously described with reference to FIGS. 8-13, one of ordinary skill in the art would recognize that one or more of the elements described in reference to FIGS. 14A-15B can be similarly embodied, where appropriate, as those elements described in reference to FIGS. 8-13.

Figure 14A:
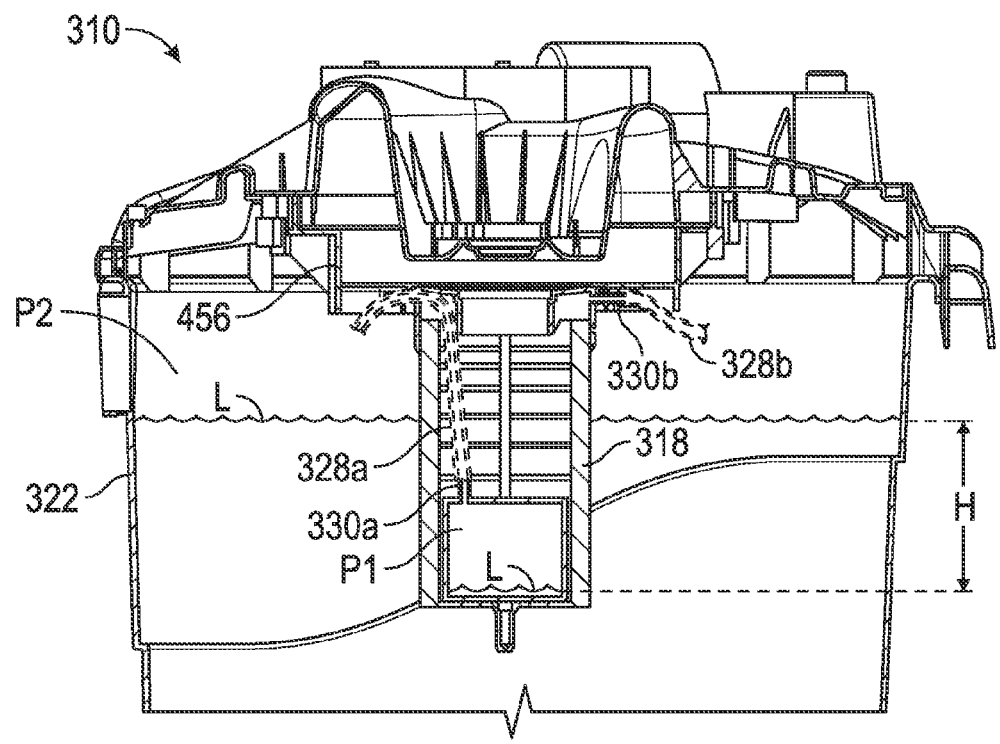
FIG. 14A illustrates a section view of a third embodiment of an exemplary vacuum cleaner of the present disclosure with several elements omitted for clarity.
Figure 14B:
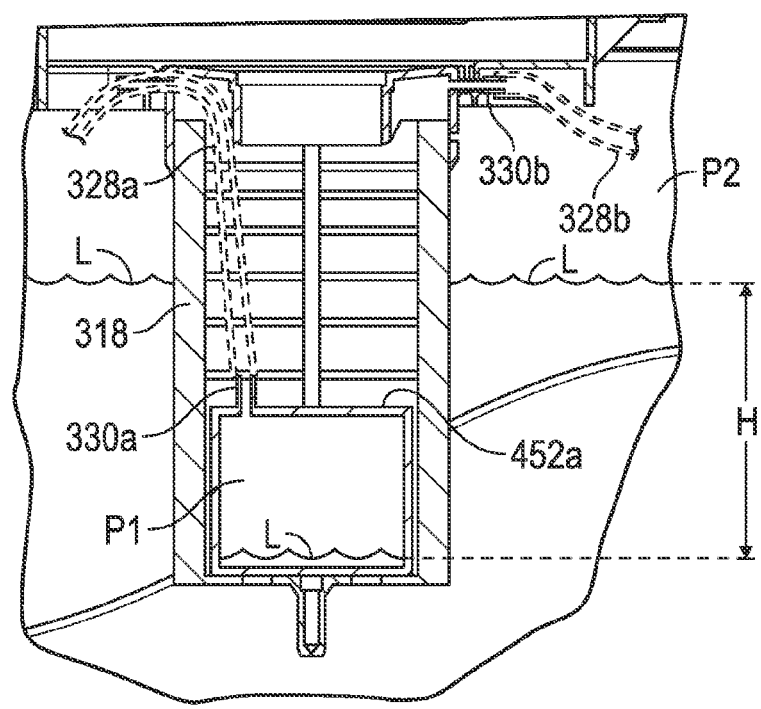
FIG. 14B illustrates an enlarged view of the vacuum cleaner of FIG. 14A.

FIG. 14A illustrates a section view of a third embodiment of an exemplary vacuum cleaner of the present disclosure with several elements omitted for clarity. FIG. 14B illustrates an enlarged view of the vacuum cleaner of FIG. 14A. The Figures will be described in conjunction with one another.

In addition to many of the components described in FIG. 8 above with reference to vacuum 110, vacuum 310 can further include a cage 318, first conduits 328a and 328b, housing pressure taps 330a and 330b, and drum 322. Further, vacuum 310 can include a lid (not shown) and an air-trap 452a.

The air-trap 452a can be configured in a number of sizes and shapes and in a variety of locations within the drum 322. For example, the air-trap can be cylindrical in shape with airtight top and side portions with an open bottom. Other geometric shapes, in the alternative, are contemplated as well. Air-trap 452a (and similarly air-trap 452b as described in greater detail below) can include any air chamber, plenum, compartment, or any other void that is capable or retaining a gas. The air-trap 452a can be coupled to a portion of the drum 322, or in the alternative, another portion or portions of the vacuum 310 (such as, for example, the filter cage or lid (not shown)). In this configuration, the air-trap 452a can be rigidly mounted or affixed to these portions to prevent it from rising and falling with the amount of liquid stored in the drum 322.

In an exemplary and non-limiting illustrative embodiment, air-trap 452a can take the shape of an upside-down container, such as a cup or the like, with a housing pressure tap 330a coupled to the top portion of the air-trap 452a. As noted above, air-trap 452a can be disposed at various locations within the drum 322. In one embodiment, the air-trap 452a can be disposed within the vacuum's 310 filter cage 318. In this embodiment, the air-trap 452a can be formed as a separate component as the filter cage, or, in the alternative, as a single monolith piece (e.g., as a single molded component including both of these elements). An embodiment where the air-trap 452a is disposed within the filter cage 318 is described in conjunction with FIGS. 14A and 14B. Alternatively, the air-trap can be disposed within the vacuum's drum 322 at a location outside the filter cage 318. This embodiment—where the air-trap is labeled as element 452b—is described in conjunction with FIGS. 15A and 15B in greater detail below.

Referring specifically to FIGS. 14A and 14B, as liquid enters the drum 322 and it falls to the bottom of the drum, the level of liquid "L" in the drum will rise. Because the air-trap 452a is coupled to filter cage 318, liquid rising in the drum will rise above the air-trap 452a (as shown, for example, in FIG. 14A). However, because air-trap 452a can be rigidly mounted and airtight, air will be trapped in air-trap 452a and the liquid will be prevented from entering within the air-trap 452a. As shown in FIG. 14A, for example, liquid level L at air-trap 452a is near the bottom of air-trap 452a even when liquid level L within the drum 322 is above the top portion of air-trap 452a. The height differential "H," as measured between the height of the liquid level "L" within the drum and the liquid level "L" around the air-trap 452a, creates a resulting pressure P1 within air-trap 452a. As the liquid rises within the drum 322, the pressure differential between pressure P1 and pressure P2 (as measured within the drum 322) will increase, and will be proportional to the height differential H. This pressure differential is commonly referred to the "pressure head" or "inches of water" in the case the liquid in the drum 322 is water.

In order to detect the pressure differential as a result of the rising liquid within the drum 322, housing pressure tap 330a can be coupled to the top portion of the air-trap 452a, and housing pressure tap 330b can be coupled to a portion within the drum (above the rising liquid). First conduit 328a can be coupled to housing pressure tap 330a and first conduit 328b can be coupled to housing pressure tap 330b. Under "normal" operating conditions (i.e., when there is little or no liquid in the drum 322), pressure P1 will be approximately equal to pressure P2. However, as the drum 322 accumulates liquid, the liquid level L outside air-trap 452a will rise above air-trap 452a and thus, pressure P1 will exceed pressure P2. The difference in these two pressures will be proportional to height differential H between the liquid level L of the liquid contacting the bottom portion of air-trap 452a and the liquid level L inside the drum.

This pressure differential will cause a membrane (e.g., the membrane 140 shown in conjunction with FIGS. 8-13) to expand, forcing a portion of the membrane in an upwardly direction that will result in it contacting a stem insert area (e.g., the stem insert area 212 shown in conjunction with FIGS. 8-13) of a reset shaft (e.g., the reset shaft 214 shown in conjunction with FIGS. 8-13). The remainder of the structure and operation of the vacuum 310 is similar to the structure and operation of the vacuum 110 as discussed above with references to FIGS. 8-13 with regard to the operation of the reset shaft 214 trigging the micro switch 238 and disabling the current flow to the vacuum's power supply (see, e.g., the description under the heading "Disabling the Power Supply") and resetting the vacuum 310 (see, e.g., the description under the heading "Resetting the Power Supply") as described in greater detail above.

Figure 15A:
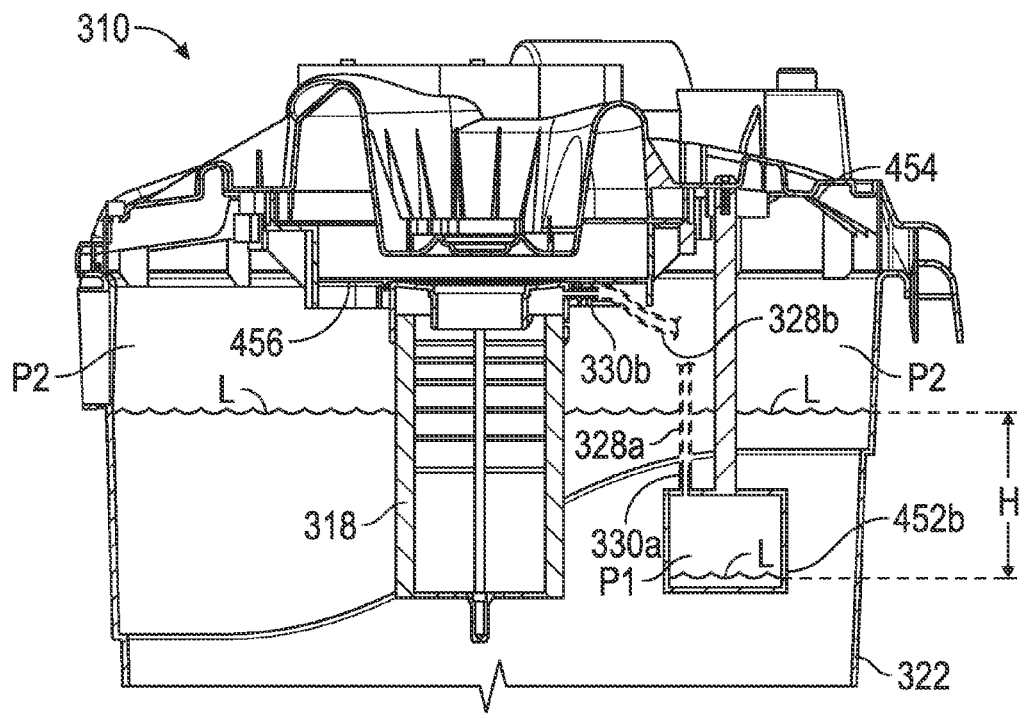
FIG. 15A illustrates a section view of an alternative to the third embodiment of an exemplary vacuum cleaner of the present disclosure with several elements omitted for clarity.
Figure 15B:
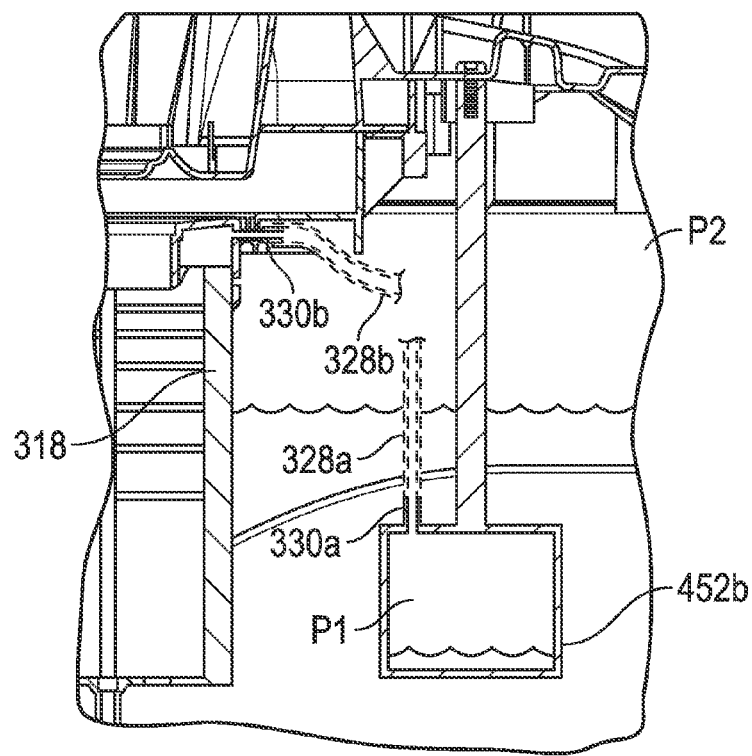
FIG. 15B illustrates an enlarged view of the vacuum cleaner of FIG. 15A.

FIG. 15A illustrates a section view of an alternative to the third embodiment of an exemplary vacuum cleaner of the present disclosure with several elements omitted for clarity. FIG. 15B illustrates an enlarged view of the vacuum cleaner of FIG. 15A. These Figures will be described in conjunction with one another.

In an alternative embodiment, air-trap 452b can be disposed outside the filter cage 318, but inside drum 322. In one example, the air-trap 452b can be coupled or secured to a portion of a lid 454. In another example, air-trap 452b can be coupled or secured to a portion of the drum 322, such as the side of drum 322. In an exemplary and non-limiting illustrative embodiment, air-trap 452b can be rigidly secured to ensure that its position within the drum 322 is not affected by the rise and/or fall of the liquid stored within it.

As liquid enters the drum 322 and it falls to the bottom of the drum, the level of liquid "L" in the drum will rise. Because the air-trap 452b is coupled to the lid 454, or in the alternative, another portion or portions of the vacuum 310, liquid rising in the drum will rise above the air-trap 452b (as shown, for example, in FIG. 15A). However, because air-trap 452b can be rigidly mounted and airtight, air will be trapped in air-trap 452b and the liquid will be prevented from entering within the air-trap 452b. As shown in FIG. 15A, for example, liquid level L at air-trap 452b is near the bottom of air-trap 452b even when liquid level L within the drum 322 is well above the top portion of air-trap 452b.

In order to detect the pressure differential as a result of the rising liquid within the drum 322, housing pressure tap 330a can be coupled to the top portion of the air-trap 452b, and housing pressure tap 330b can be coupled to a portion within the drum (above the rising liquid). First conduit 328a can be coupled to housing pressure tap 330a and first conduit 328b can be coupled to housing pressure tap 330b. Under "normal" operating conditions (i.e., when there is little or no liquid in the drum 322), pressure P1 will be approximately equal to pressure P2. However, as the drum 322 accumulates liquid, the liquid level L outside air-trap 452b will rise above air-trap 452b and thus, pressure P1 will exceed the pressure P2. The difference in these two pressures will be proportional to the height differential H between the liquid level L of the liquid contacting the bottom portion of air-trap 452b and the liquid level L inside the drum.

This pressure differential will cause a membrane (e.g., the membrane 140 shown in conjunction with FIGS. 8-13) to expand, forcing a portion of the membrane in an upwardly direction that will result it contacting a stem insert area (e.g. the stem insert area 212 shown in conjunction with FIGS. 8-13) of a reset shaft (e.g., the reset shaft 214 shown in conjunction with FIGS. 8-13). The remainder of the structure and operation of the vacuum 310 is similar to structure and operation of the vacuum 110 as discussed above with references to FIGS. 8-13 with regard to the operation of the reset shaft 214 trigging the micro switch 238 and disabling the current flow to the vacuum's power supply (see, e.g., the description under the heading "Disabling the Power Supply") and resetting the vacuum 310 (see, e.g., the description under the heading "Resetting the Power Supply") as described in greater detail above.

Figure 16:
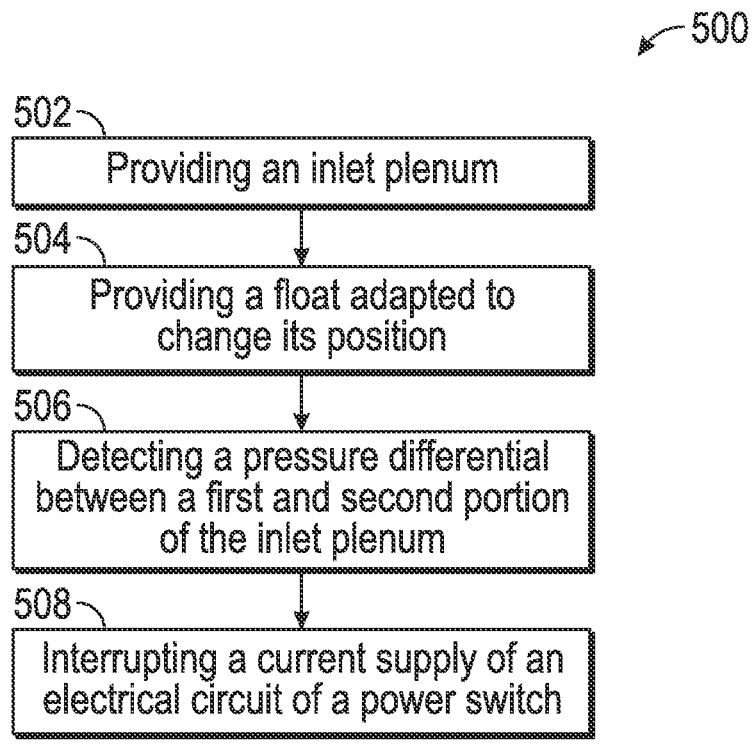
FIG. 16 illustrates a flow diagram depicting an exemplary method for interrupting a power supply to a vacuum cleaner motor in accordance with certain aspects of the present disclosure.

FIG. 16 illustrates a flow diagram depicting an exemplary method for interrupting a power supply to a vacuum cleaner motor in accordance with certain aspects of the present disclosure. The method 500 can include the step 502 of providing an inlet plenum and the step 504 of providing a float adapted to change its position. The position of the float can be a function of an amount of liquid stored in the vacuum cleaner. The method 500 can further include the step 506 of detecting a pressure differential between a first and second portion of the inlet plenum and the step 508 of interrupting a current supply of an electrical circuit of a power switch.

The step 506 of detecting a pressure differential between a first and second portion of the inlet plenum can be based, at least in part, upon the position of the float. Furthermore, the step 508 of interrupting a current supply of an electrical circuit of a power switch can be based on the detected pressure differential between the first and second portion of the inlet plenum.

Although not explicitly illustrated in FIG. 16, the method 500 of interrupting a power supply to a vacuum cleaner motor can include additional steps and/or variations of the steps explicitly illustrated and described herein. In a non-limiting illustrative example, the method 500 can further include the processes described above with reference the structural components described, along with their functional interactions with respect to one another, under the heading "Disabling the Power Supply." Accordingly, the steps explicitly illustrated and described herein shall not be considering limiting to the inventions described herein.

Figure 17:
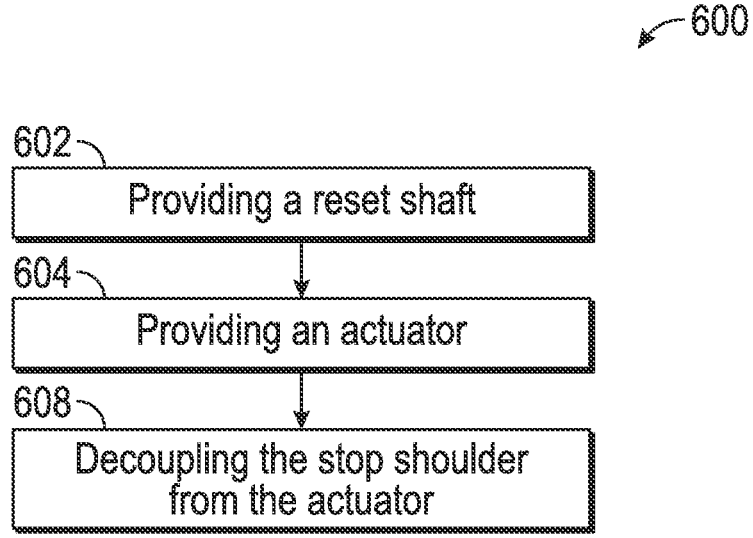
FIG. 17 illustrates a flow diagram depicting an exemplary method for activating a power supply to a vacuum cleaner motor in accordance with certain aspects of the present disclosure.

FIG. 17 illustrates a flow diagram depicting an exemplary method for activating a power supply to a vacuum cleaner motor in accordance with certain aspects of the present disclosure. The method 600 can include the step 602 of providing a reset shaft, the step 604 of providing an actuator, and the step 606 of decoupling a stop shoulder from the actuator. The step 602 of providing a reset shaft can further include a reset shaft wherein at least a portion of the reset shaft is disposed as an external surface of a vacuum cleaner. Further, the step 604 of providing an actuator can further include an actuator that is coupled to the stop shoulder and a power switch comprising an electrical circuit. Moreover, the step 606 of decoupling from the stop shoulder from the actuator is adapted to complete an electrical circuit coupled to the vacuum cleaner motor.

Although not explicitly illustrated in FIG. 17, the method 600 of activating a power supply to a vacuum cleaner motor can include additional steps and/or variations of the steps explicitly illustrated and described herein. In a non-limiting illustrative example, the method 600 can further include the processes described above with reference the structural components described, along with their functional interactions with respect to one another, under the heading "Resetting the Power Supply." Accordingly, the steps explicitly illustrated and described herein shall not be considering limiting to the inventions described herein.

Particular embodiments of the invention may be described below with reference to block diagrams and/or operational illustrations of methods. It will be understood that each block of the block diagrams and/or operational illustrations, and combinations of blocks in the block diagrams and/or operational illustrations, can be implemented by analog and/or digital hardware, and/or computer program instructions. Such computer program instructions may be provided to a processor of a general-purpose computer, special purpose computer, ASIC, and/or other programmable data processing system. The executed instructions may create structures and functions for implementing the actions specified in the block diagrams and/or operational illustrations.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions. Discussion of singular elements can include plural elements and vice-versa.

In some alternate implementations, the functions/actions/structures noted in the figures may occur out of the order noted in the block diagrams and/or operational illustrations. For example, two operations shown as occurring in succession, in fact, may be executed substantially concurrently or the operations may be executed in the reverse order, depending upon the functionality/acts/structure involved. For example, FIG. 16 illustrates one possible embodiment of a method. More specifically, as presently disclosed in FIG. 16, the step 504 of providing a float adapted to change its position occurs after the step 502 of providing an inlet plenum. Other embodiments can include performing step 504 before step 502. In other embodiments, some steps can be omitted altogether. Therefore, though not explicitly illustrated in the Figures, any and all combinations or sub-combinations of the steps illustrated in FIG. 16, or additional steps described in the Figures or the detailed description provided herein, can be performed in any order, with or without regard for performing the other recited steps.

The inventions have been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicants, but rather, in conformity with the patent laws, Applicants intend to fully protect all such modifications and improvements that come within the scope or range or equivalent of the following claims.

What is claimed is:

1. An apparatus for interrupting a power supply to a vacuum cleaner motor, the apparatus comprising:
    an inlet plenum;
    at least two pressure taps adapted to detect a pressure differential between a first and second portion of the inlet plenum;
    a float adapted to change its position as a function of an amount of liquid stored in a vacuum cleaner;
    a power switch adapted to toggle from an "on" position to an "off" position based on the pressure differential between the first and second portion of the inlet plenum; and
    a membrane, wherein the membrane is adapted to flex in response to the pressure differential between the first and second portion of the inlet plenum.

2. The apparatus of claim 1, wherein the first and second portion of the inlet plenum include an area inside the inlet plenum and an area outside the inlet plenum, respectively.

3. The apparatus of claim 1, wherein the pressure differential is a result of the float contacting at least a portion of the inlet plenum.

4. The apparatus of claim 3, wherein the float rises and falls as the amount of liquid stored in the vacuum cleaner increases and decreases, respectively.

5. The apparatus of claim 4, wherein the float rises to contact the at least a portion of the inlet plenum as the amount of liquid stored in the vacuum clean approaches its maximum capacity.

6. The apparatus of claim 1 further comprising a switch actuator and a biasing device, wherein the switch actuator is coupled to the power switch and is further adapted to toggle the power switch depending upon a state of the biasing device.

7. The apparatus of claim 6, wherein the power switch is toggled from the "on" position to the "off" position when the state of the biasing device is an uncompressed state.

8. An apparatus for interrupting a power supply to a vacuum cleaner motor, the apparatus comprising:
    an inlet plenum;
    at least two pressure taps adapted to detect a pressure differential between a first and second portion of the inlet plenum;
    a float adapted to change its position as a function of an amount of liquid stored in a vacuum cleaner;
    a power switch comprising an electrical circuit, wherein a current supply to the electrical circuit is adapted to be interrupted based on the pressure differential between the first and second portion of the inlet plenum; and
    a membrane, wherein the membrane is adapted to flex in response to the pressure differential between the first and second portion of the inlet plenum.

9. The apparatus of claim 8, wherein the first and second portion of the inlet plenum include an area inside the inlet plenum and an area outside the inlet plenum, respectively.

10. The apparatus of claim 8, wherein the pressure differential is a result of the float contacting at least a portion of the inlet plenum.

11. The apparatus of claim 10, wherein the float rises and falls as the amount of liquid stored in the vacuum cleaner increases and decreases, respectively.

12. The apparatus of claim 11, wherein the float rises to contact the at least a portion of the inlet plenum as the amount of liquid stored in the vacuum clean approaches its maximum capacity.

13. The apparatus of claim 8 further comprising a switch shoulder and an actuator, wherein the current supply is adapted to be interrupted depending upon the position of the actuator.

14. The apparatus of claim 13, wherein the current supply is interrupted when the switch shoulder contacts the actuator.

15. An apparatus for interrupting a power supply to a vacuum cleaner motor, the apparatus comprising:
- an air chamber, wherein the pressure of air in the air chamber is adapted to vary as a function of an amount of liquid stored in a vacuum cleaner;
- at least two pressure taps adapted to detect a pressure differential between a first and second portion of the vacuum cleaner;
- a power switch comprising an electrical circuit, wherein a current supply to the electrical circuit is adapted to be interrupted based on the pressure differential between the first and second portion of the vacuum cleaner; and
- a membrane, wherein the membrane is adapted to flex in response to the pressure differential between the first and second areas of the vacuum cleaner.

16. The apparatus of claim 15, wherein the first and second portion of the vacuum cleaner include an area inside the air chamber and an area outside the air chamber, respectively.

17. The apparatus of claim 15, wherein the pressure differential increases as the level of liquid stored in the vacuum cleaner increases above the bottom level of air trapped within the air chamber.

* * * * *